United States Patent
Uno et al.

(10) Patent No.: US 9,773,619 B2
(45) Date of Patent: *Sep. 26, 2017

(54) MULTILAYER CAPACITOR AND INSTALLATION STRUCTURE OF MULTILAYER CAPACITOR

(71) Applicant: Murata Manufacturing Co., Ltd., Nagaokakyo-shi, Kyoto-fu (JP)

(72) Inventors: Sui Uno, Nagaokakyo (JP); Takashi Sawada, Nagaokakyo (JP); Yohei Mukobata, Nagaokakyo (JP)

(73) Assignee: Murata Manufacturing Co., LTd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/393,346

(22) Filed: Dec. 29, 2016

(65) Prior Publication Data

US 2017/0110248 A1    Apr. 20, 2017

Related U.S. Application Data

(63) Continuation of application No. 14/701,758, filed on May 1, 2015, now Pat. No. 9,633,787.

(30) Foreign Application Priority Data

Aug. 13, 2014    (JP) .................. 2014-164920

(51) Int. Cl.
   *H01G 4/30*    (2006.01)
   *H01G 4/228*   (2006.01)
   (Continued)

(52) U.S. Cl.
   CPC ............ *H01G 4/30* (2013.01); *H01G 4/012* (2013.01); *H01G 4/232* (2013.01)

(58) Field of Classification Search
   CPC ........... H01G 4/30; H01G 4/228; H01G 4/232
   (Continued)

(56) References Cited

U.S. PATENT DOCUMENTS

2008/0186652 A1*   8/2008   Lee .................. H01G 4/012
                                                   361/306.3
2010/0091427 A1*   4/2010   Lee .................. H01G 4/232
                                                   361/306.3
(Continued)

OTHER PUBLICATIONS

Uno et al., "Multilayer Capacitor and Installation Structure of Multilayer Capacitor", U.S. Appl. No. 14/701,758, filed May 1, 2015.

(Continued)

*Primary Examiner* — Eric Thomas
(74) *Attorney, Agent, or Firm* — Keating & Bennett, LLP

(57) ABSTRACT

In a multilayer capacitor, a multilayer capacitor main body includes first and second main surfaces, first and second side surfaces, and first and second end surfaces, the first and second main surfaces extending in a length direction and a width direction, the first and second side surfaces extending in the length direction and a thickness direction, and the first and second end surfaces extending in the width direction and the thickness direction. The second main surface is depressed in a portion extending from opposite ends of the second main surface toward a center of the second main surface in the length direction.

4 Claims, 23 Drawing Sheets

(51) Int. Cl.
*H01G 4/232* (2006.01)
*H01G 4/012* (2006.01)

(58) Field of Classification Search
USPC .................................. 361/301.4, 306.3, 303
See application file for complete search history.

(56) References Cited

U.S. PATENT DOCUMENTS

| | | | | |
|---|---|---|---|---|
| 2010/0149769 A1* | 6/2010 | Lee | ........................ | H01G 2/065 |
| | | | | 361/768 |
| 2013/0050893 A1* | 2/2013 | Kim | ........................ | H01G 4/228 |
| | | | | 361/306.3 |
| 2013/0050897 A1* | 2/2013 | Kim | ........................ | H01G 4/12 |
| | | | | 361/321.2 |
| 2013/0050899 A1* | 2/2013 | Kim | ........................ | H01G 4/30 |
| | | | | 361/321.2 |
| 2013/0058006 A1* | 3/2013 | Kim | ........................ | H01G 4/12 |
| | | | | 361/321.2 |
| 2014/0160618 A1* | 6/2014 | Yoon | ........................ | H01G 4/30 |
| | | | | 361/301.4 |
| 2016/0049243 A1* | 2/2016 | Uno | ........................ | H01G 4/012 |
| | | | | 361/303 |

OTHER PUBLICATIONS

Uno et al., "Multilayer Capacitor and Installation Structure of Multilayer Capacitor", U.S. Appl. No. 15/393,347, filed Dec. 29, 2016.

* cited by examiner

MULTILAYER CAPACITOR AND INSTALLATION STRUCTURE OF MULTILAYER CAPACITOR

BACKGROUND OF THE INVENTION

1. Field of the Invention

The present invention relates to a multilayer capacitor and an installation structure of the multilayer capacitor.

2. Description of the Related Art

A multilayer ceramic capacitor has been widely used as a capacitor which has small size and large capacitance. In the related art, a multilayer ceramic capacitor with a substantially rectangular parallelepiped shape, for example, has been widely used. For example, Japanese Unexamined Patent Application Publication No. 2013-46052 discloses a multilayer ceramic capacitor with a substantially rectangular parallelepiped shape including two main surfaces, two side surfaces and two end surfaces. The multilayer ceramic capacitor disclosed in Japanese Unexamined Patent Application Publication No. 2013-46052 includes first and second signal terminal electrodes and a grounding terminal electrode. The first and second signal terminal electrodes are respectively connected to a plurality of first inner electrodes, and the first signal terminal electrode is provided on an end portion of one of the main surfaces on one side in a length direction. The second signal terminal electrode is provided on the other end portion of the main surface on the other side in the length direction. The grounding terminal electrode is connected to a plurality of second inner electrodes. Each of the second electrodes faces each of the first electrodes via a ceramic portion. The grounding terminal electrode is provided on a portion of the main surface between the first signal terminal electrode and the second signal terminal electrode in the length direction.

The multilayer capacitor, which includes the first and second signal terminal electrodes and the grounding terminal electrode provided on the main surface, as disclosed in Japanese Unexamined Patent Application Publication No. 2013-46052 is required to have satisfactory electrical characteristics.

SUMMARY OF THE INVENTION

Preferred embodiments of the present invention provide a multilayer capacitor with satisfactory electrical characteristics.

According to a first preferred embodiment of the present invention, a multilayer capacitor includes a multilayer capacitor main body which includes first and second main surfaces, first and second side surfaces, and first and second end surfaces, the first and second main surfaces extending in a length direction and a width direction, the first and second side surfaces extending in the length direction and a thickness direction, and the first and second end surfaces extending in the width direction and the thickness direction; a first inner electrode extending in the length direction and the thickness direction and including a first effective portion, a first extending portion, and a second extending portion, the first extending portion being connected to the first effective portion and extending to the second main surface, and the second extending portion being connected to the first effective portion and extending to the second main surface; a second inner electrode extending in the length direction and the thickness direction and including a second effective portion and a third extending portion, the second effective portion facing the first effective portion in the width direction, and the third extending portion being connected to the second effective portion, not facing the first inner electrode, and extending to the second main surface; a first terminal electrode which is connected to an exposed portion of the first extending portion and extends across a portion of the second main surface on a side of the first end surface in the length direction, the first end surface, and the first and second side surfaces; a second terminal electrode which is connected to an exposed portion of the second extending portion and extends across a portion of the second main surface on a side of the second end surface in the length direction, the second end surface, and the first and second side surfaces; and a third terminal electrode which is connected to an exposed portion of the third extending portion and extends across a portion of the second main surface between the first terminal electrode and the second terminal electrode in the length direction and the first and second side surfaces; wherein a distance in the thickness direction between the first effective portion and the second main surface is shorter than a distance in the thickness direction between the first effective portion and the first main surface; and a distance in the thickness direction between the second effective portion and the second main surface is shorter than a distance in the thickness direction between the second effective portion and the first main surface.

It is preferable that the first effective portion includes a first projecting portion which projects toward the second main surface, and a minimum distance in the thickness direction between the first projecting portion and the second main surface is shorter than dimensions of the first and second extending portions, and that the second effective portion includes a second projecting portion which projects toward the second main surface, and a minimum distance in the thickness direction between the second projecting portion and the second main surface is shorter than a dimension in the thickness direction of the third extending portion.

It is preferable that a dimension of the third terminal electrode on the second main surface in the length direction is greater than a dimension of the first and second terminal electrodes on the second main surface in the length direction.

It is preferable that the first and second terminal electrodes extend across the second main surface from a first end to a second end in the width direction and have a thickest portion at a portion on a side of the first end beyond a center portion in the width direction.

It is preferable that the thickest portion projects toward the center portion in the length direction.

It is preferable that L1 represents a dimension of the exposed portion of the first extending portion in the length direction; L2 represents a dimension of the exposed portion of the second extending portion in the length direction; and L3 represents a dimension of the exposed portion of the third extending portion in the length direction; wherein L3>L1 and L3 >L2 are satisfied.

It is preferable that a distance in the length direction between the first end surface and the first extending portion at a center or approximate center of the second main surface in the width direction is smaller than each distance in the length direction between the first end surface and the first extending portion nearest to the first and second side surfaces; and a distance in the length direction between the second end surface and the second extending portion at a center or approximate center of the second main surface in the width direction is smaller than each distance in the length direction between the second end surface and the second extending portion nearest to the first and second side surfaces.

It is preferable that the first main surface does not contain any terminal electrodes thereon.

According to various preferred embodiments of the present invention, multilayer capacitors with satisfactory electrical characteristics are provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
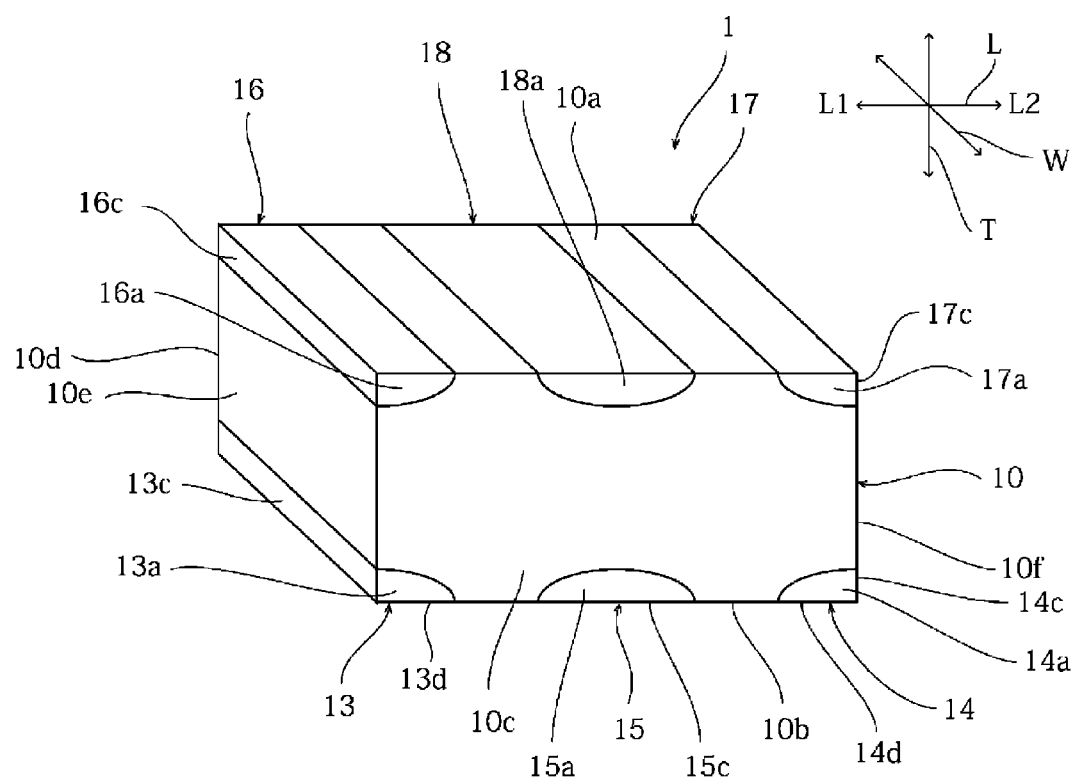
FIG. 1 is a schematic perspective view of a multilayer capacitor according to a first preferred embodiment of the present invention.

Hereinafter, examples of preferred embodiments of the present invention will be described. However, the following examples of preferred embodiments will be described only for an illustrative purpose. The present invention is not limited to the examples of the following preferred embodiments.

In the respective drawings to be referred to in the description of examples of the preferred embodiments, the same reference numerals will be given to members with the same or substantially the same functions. In addition, the drawings to be referred to in the description of the preferred embodiments are schematically depicted. Dimension ratios of objects depicted in the drawings are different from actual dimension ratios of the objects in some cases. Between drawings, dimension ratios of objects differ in some cases. Specific dimension ratios and the like of the objects should be determined in consideration of the following description.

Figure 2:
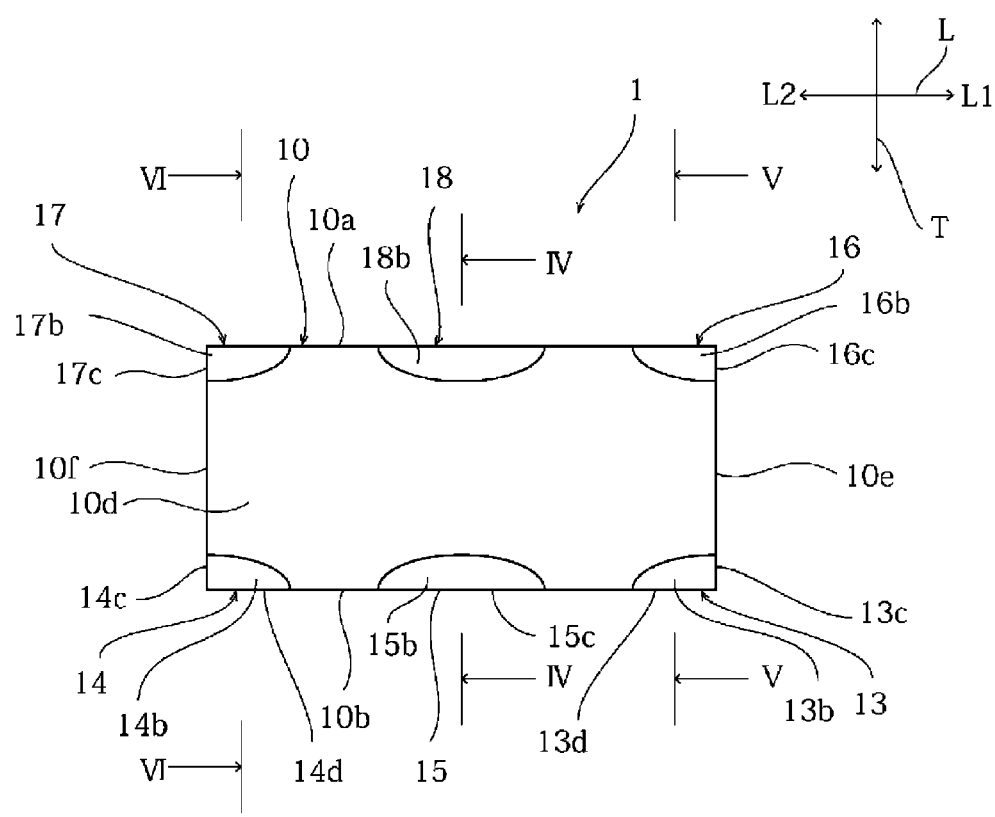
FIG. 2 is a schematic front view of a second side surface of the multilayer capacitor according to the first preferred embodiment of the present invention.
Figure 3:
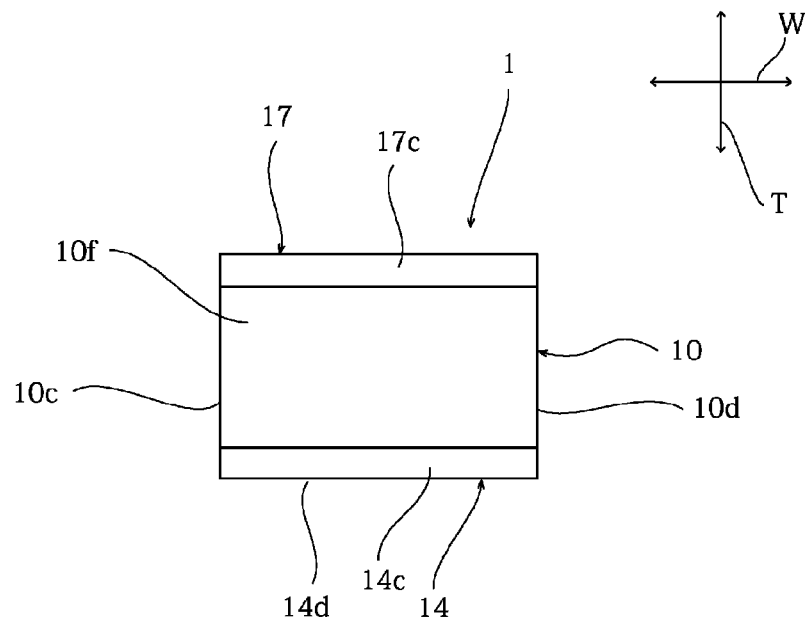
FIG. 3 is a schematic front view of a second end surface of the multilayer capacitor according to the first preferred embodiment of the present invention.
Figure 4:
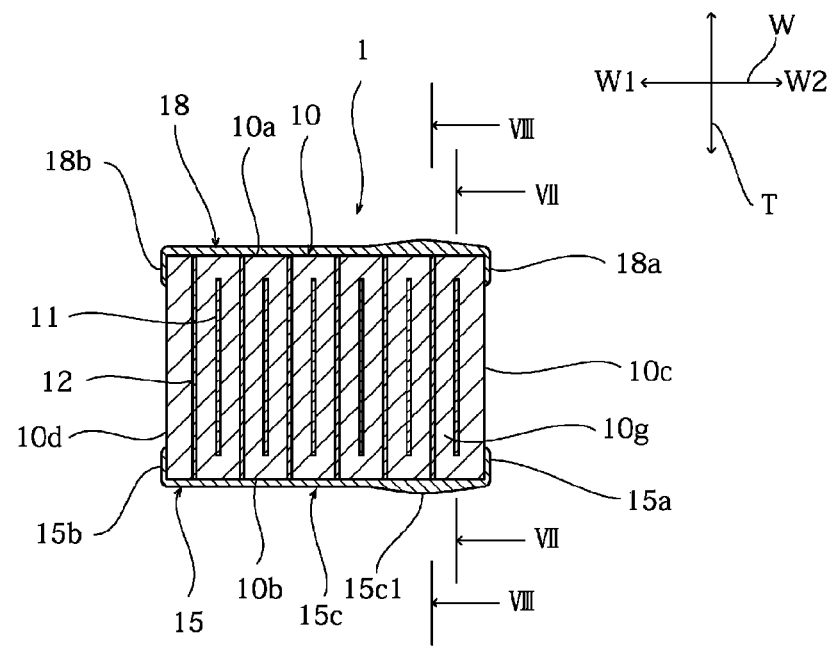
FIG. 4 is a schematic cross-sectional view taken along line IV-IV in FIG. 2.
Figure 5:
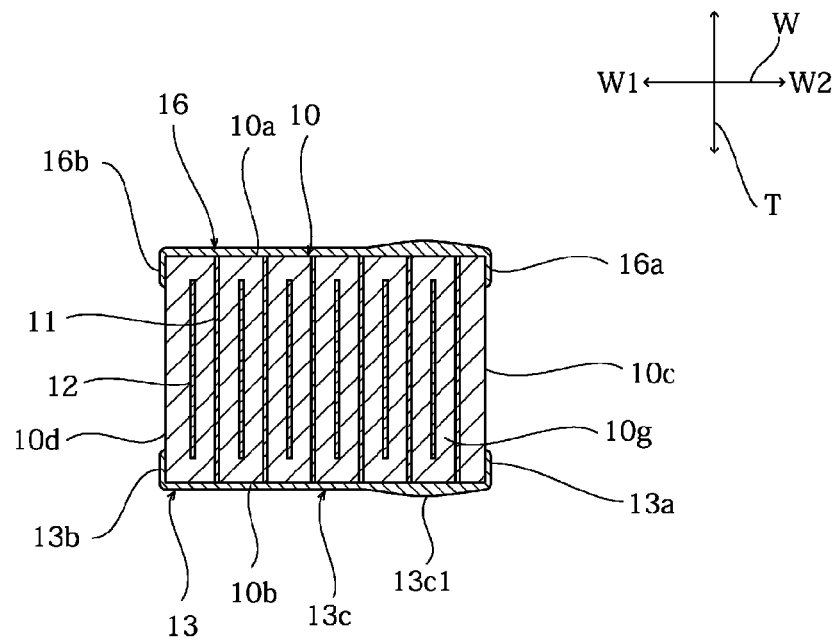
FIG. 5 is a schematic cross-sectional view taken along line V-V in FIG. 2.
Figure 6:
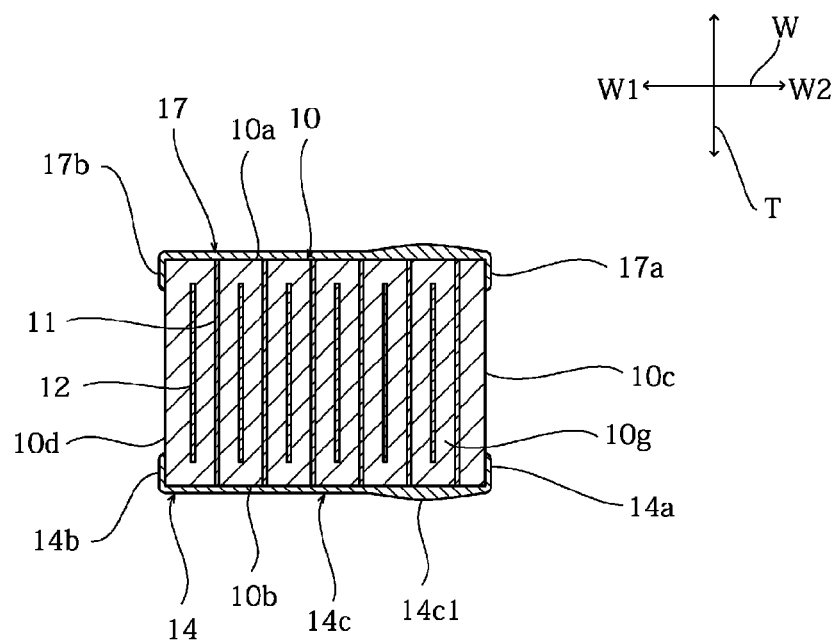
FIG. 6 is a schematic cross-sectional view taken along line VI-VI in FIG. 2.
Figure 7:
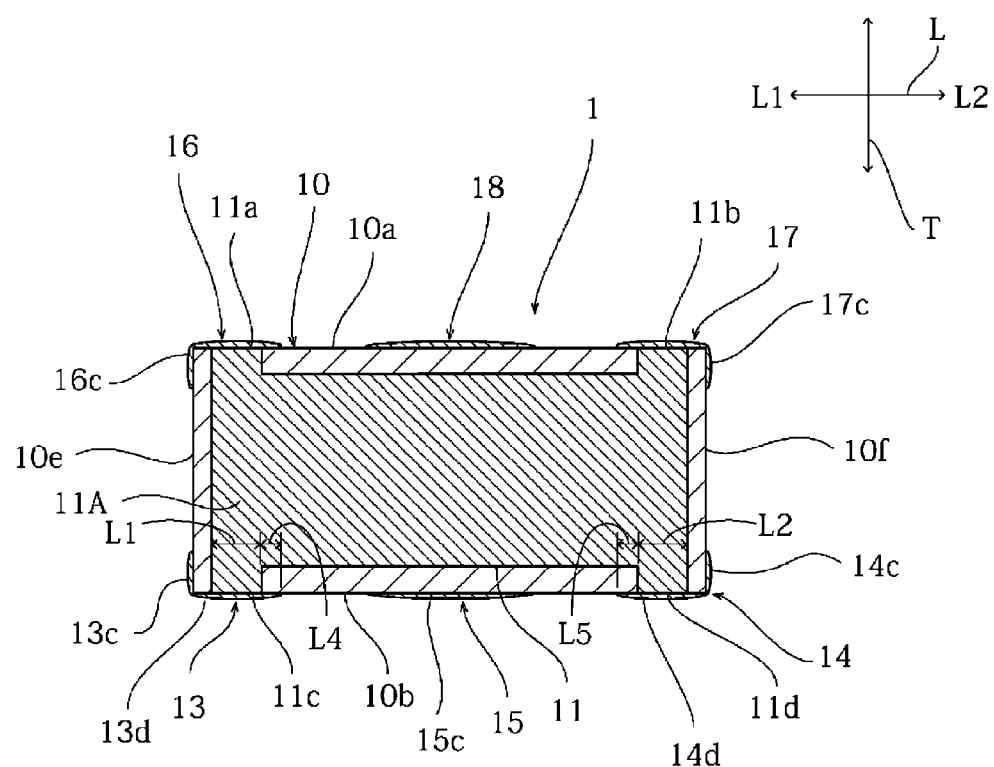
FIG. 7 is a schematic cross-sectional view taken along line VII-VII in FIG. 4.
Figure 8:
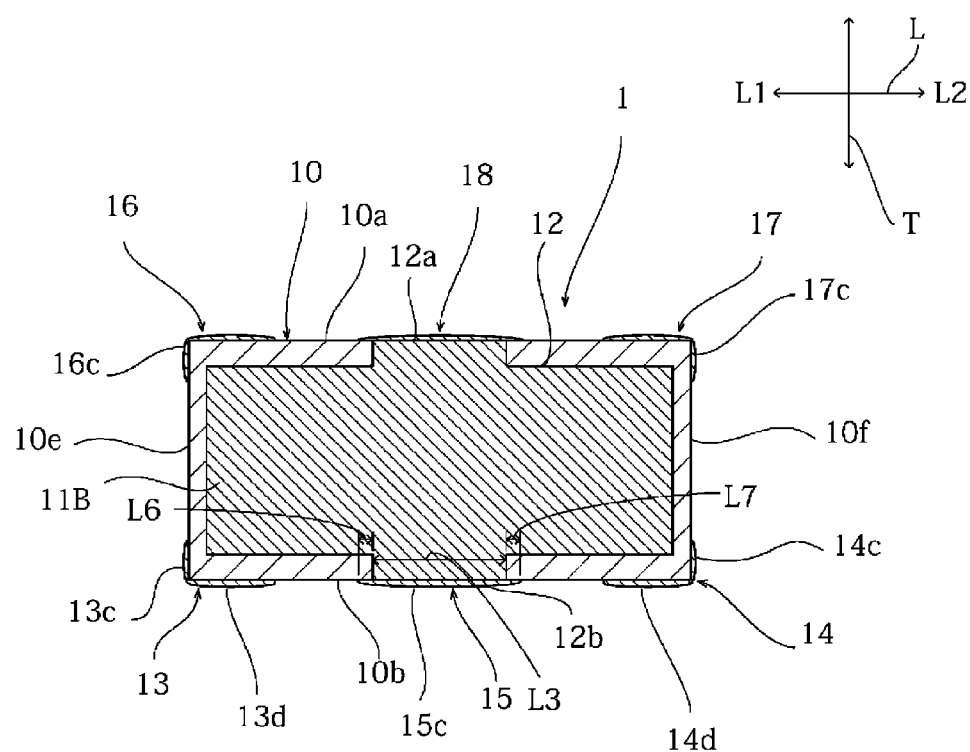
FIG. 8 is a schematic cross-sectional view taken along line VIII-VIII in FIG. 4.
Figure 9:
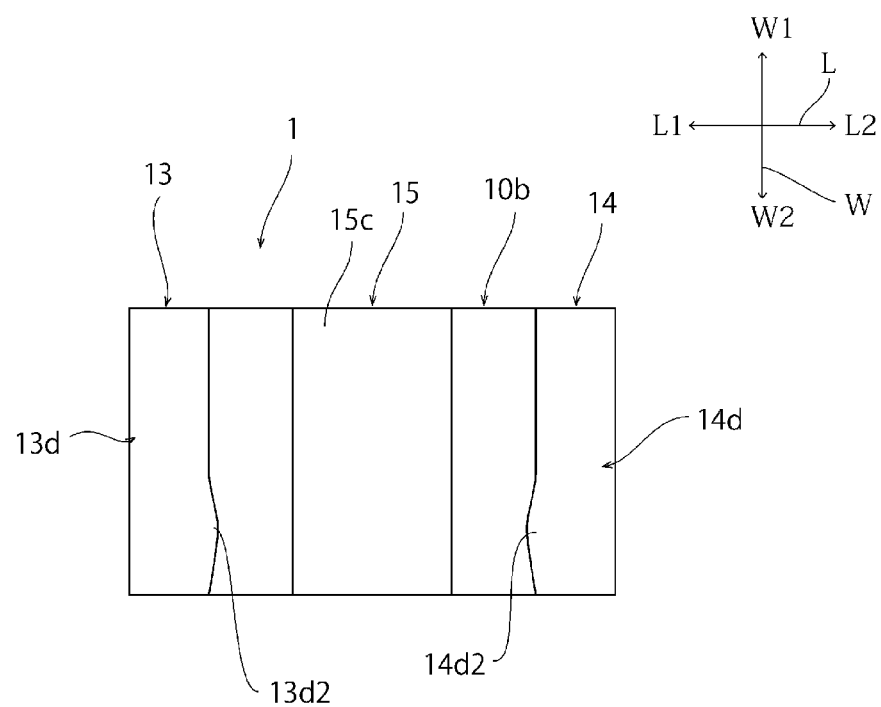
FIG. 9 is a schematic bottom view of the multilayer capacitor according to the first preferred embodiment of the present invention.

FIG. 1 is a schematic perspective view of a multilayer capacitor 1 according to a preferred embodiment of the present invention, which includes two main surfaces, two side surfaces and two edge surfaces. FIG. 2 is a schematic front view of a second side surface of the multilayer capacitor 1 according to the present preferred embodiment. FIG. 3 is a schematic front view of a second end surface of the multilayer capacitor 1 according to the present preferred embodiment. FIG. 4 is a schematic cross-sectional view taken along line IV-IV in FIG. 2. FIG. 5 is a schematic cross-sectional view taken along line V-V in FIG. 2. FIG. 6 is a schematic cross-sectional view taken along line VI-VI in FIG. 2. FIG. 7 is a schematic cross-sectional view taken along line VII-VII in FIG. 4. FIG. 8 is a schematic cross-sectional view taken along line VIII-VIII in FIG. 4. FIG. 9 is a schematic bottom view of the multilayer capacitor according to the first preferred embodiment. In other words, FIG. 9 is a schematic front view of a second main surface of the multilayer capacitor 1 according to the first preferred embodiment.

As shown in FIGS. 1 to 6, a multilayer capacitor 1 is provided with a multilayer capacitor main body 10. The multilayer capacitor main body 10 preferably has a rectangular or substantially rectangular parallelepiped shape. Corner portions and ridge portions of the multilayer capacitor main body 10 may be chamfered or rounded. In addition, convexities and concavities may be provided on main surfaces and/or side surfaces.

The multilayer capacitor main body 10 includes first and second main surfaces 10a and 10b, first and second side surfaces 10c and 10d, and first and second end surfaces 10e and 10f. The first and second main surfaces 10a and 10b respectively extend in a width direction W and a length direction L. The first and second side surfaces 10c and 10d respectively extend in the width direction W and a thickness direction T. The first and second end surfaces 10e and 10f respectively extend in the length direction L and the thickness direction T. The length direction L is orthogonal to the width direction. The thickness direction T is orthogonal to each of the length direction L and the width direction W.

A dimension of the multilayer capacitor 1 in the length direction L is preferably from about 2.00 mm to about 2.10 mm, for example. A dimension of the multilayer capacitor 1 in the thickness direction T is preferably from about 0.7 mm to about 1.0 mm, for example. A dimension of the multilayer capacitor 1 in the width direction W is preferably from about 1.20 mm to about 1.40 mm, for example.

In addition, the dimensions of the multilayer capacitor 1 in the length direction L, the thickness direction T and the width direction W can be measured by using an easily accessible micrometer, for example, MDC-25MX manufactured by Mitutoyo Corporation.

The multilayer capacitor main body 10 is made of appropriate ceramics in accordance with functions of the multilayer capacitor 1. Specifically, the multilayer capacitor main body 10 can be formed of dielectric ceramics, for example. Specific examples of the dielectric ceramics include $BaTiO_3$, $CaTiO_3$, $SrTiO_3$, and $CaZrO_3$. An accessory component such as an Mn compound, Mg compound, Si compound, Fe compound, Cr compound, Co compound, Ni compound, Al compound, V compound, or a rare earth compound may be appropriately added to the multilayer capacitor main body 10 in accordance with characteristics required for the multilayer capacitor 1.

As shown in FIGS. 4 to 6, a plurality of first inner electrodes 11 and a plurality of second inner electrodes 12 are provided inside the multilayer capacitor main body 10. The first inner electrodes 11 and the second inner electrodes 12 are respectively provided in the length direction L and the thickness direction T. The first inner electrodes 11 and the second inner electrodes 12 are alternately provided at predetermined intervals in the width direction W. A first inner electrode 11 and a second inner electrode 12 which are adjacent to each other in the width direction W face each other in the width direction W via a ceramic portion 10g.

As shown in FIG. 7, each first inner electrode 11 extends to the first and second main surfaces 10a and 10b, respectively. Specifically, each first inner electrode 11 includes first to fourth extending portions 11a to 11d. A portion of the first extending portion 11a and a portion of the second extending portion 11b are exposed at predetermined portions of the first main surface 10a. A portion of the third extending portion 11c and a portion of the fourth extending portion 11d are exposed at predetermined portions of the second main surface 10b. In other words, the first extending portion 11a extends to a portion of the first main surface 10a on an L(A) side in the length direction L. The second extending portion 11b extends to a portion of the first main surface 10 on an L(B) side in the length direction L. The third extending portion 11c extends to a portion of the second main surface 10b on the L(A) side in the length direction L. The fourth extending portion 11d extends to a portion of the second main surface 10b on the L(B) side in the length direction L. Each first inner electrode 11 is spaced away from the first and second end surfaces 10e and 10f. That is, each first inner electrode 11 does not extend to the first and second end surfaces 10e and 10f. In other words, each first inner electrode 11 preferably does not have any portions which are exposed at the first and second end surfaces.

As shown in FIG. 8, each second inner electrode 12 extends to the first and second main surfaces 10a and 10b, respectively. Specifically, each second inner electrode 12 includes first and second extending portions 12a and 12b.

A portion of the second extending portion 12a is exposed at a predetermined portion of the first main surface 10a. A portion of the second extending portion 12b is exposed at a predetermined portion of the second main surface 10b. In other words, the first extending portion 12a extends to a center portion of the first main surface 10a in the length direction L. The second extending portion 12b extends to a center portion of the second main surface 10b in the length direction L. The first and second extending portions 12a and 12b and the first to fourth extending portions 11a to 11d are configured so as not to face each other in the width direction W. Each second inner electrode 12 is spaced away from the first and second end surfaces 10e and 10f. That is, each second inner electrode 12 does not extend to the first and second end surfaces 10e and 10f. In other words, each first inner electrode 12 does not have any portions which are exposed at the first and second end surfaces.

The first and second inner electrodes 11 and 12 can be configured of metal such as Ni, Cu, Ag, Pd, Au, or Ag—Pd alloy, for example.

As shown in FIGS. 1, 2, 7, and 8, first to third terminal electrodes 13 to 15 are provided on the second main surface 10b. According to the present preferred embodiment, the first terminal electrodes 13 and the second terminal electrode 14 respectively configure ground terminal electrodes (negative terminal electrode). The third terminal electrode 15 configures a signal terminal electrode (positive terminal electrode).

As shown in FIG. 1, the terminal electrode 13 is provided on a portion of the second main surface 10b on a side of the first end surface 10e (L(A) side) in the length direction L. The terminal electrode 13 extends across the second main surface 10b from an end portion on one side to an end portion on the other side in the width direction W. The terminal electrode 13 extends across the first and second side surfaces 10c and 10d and the first end surface 10c from the second main surface 10b. The terminal electrode 13 includes a portion 13a provided on the first side surface 10c, a portion 13b provided on the second side surface 10d, and a portion 13c provided on the first end surface 10e. The terminal electrode 13 does not reach the first main surface 10a. That is, the portions 13a to 13c do not reach the first main surface 10a. A length of the portions 13a to 13c in the thickness direction T is preferably less than about ½ of a length of the multilayer capacitor main body 10 in the thickness direction T, and is more preferably equal to or less than about ⅓ of the length of the multilayer capacitor main body 10 in the thickness direction T, for example.

A dimension of the terminal electrode 13 in the length direction L of the second main surface is preferably from about 0.35 mm to about 0.45 mm, for example.

As shown in FIGS. 5 and 7, the terminal electrode 13 is connected to the first inner electrodes 11. The terminal electrode 13 covers the exposed portion of the third extending portion 11c of each first inner electrode 11.

As shown in FIG. 1, the terminal electrode 14 is provided at a portion of the second main surface 10b on a side of the second end surface 10f (L(B) side) in the length direction L. The terminal electrode 14 extends across the second main surface 10b from the end portion on one side to the end portion on the other side in the width direction W. The terminal electrode 14 extends across the first and second side surfaces 10c and 10d and the second end surface 10f from the second main surface 10b. The terminal electrode 14 includes a portion 14a provided on the first side surface 10c, a portion 14b provided on the second side surface 10d, and a portion 14c provided on the second end surface 10f. The terminal electrode 14 does not reach the first main surface 10a. That is, the portions 14a to 14c do not reach the first main surface 10a. A length of the portions 14a to 14c in the thickness direction T is preferably less than about ½ of the length of the multilayer capacitor main body 10 in the thickness direction T, and is more preferably equal to or less than about ⅓ of the length of the multilayer capacitor main body 10 in the thickness direction T, for example.

A dimension of the terminal electrode 14 in the length direction L of the second main surface is preferably from about 0.35 mm to about 0.45 mm, for example.

As shown in FIGS. 6 and 7, the terminal electrode 14 is connected to the first inner electrodes 11. The terminal electrode 14 covers the exposed portion of the fourth extending portion 11d of each first inner electrode 11.

As shown in FIG. 1, the terminal electrode 15 is provided at a portion of the second main surface 10b between the terminal electrode 13 and the terminal electrode 14 in the length direction L. The terminal electrode 15 extends across the second main surface 10b from the end portion on one side to the end portion on the other side in the width direction W. The terminal electrode 15 is spaced away from the terminal electrodes 13 and 14. The terminal electrode 15 extends across the first and second side surfaces 10c and 10d from the second main surface 10b. The terminal electrode 15 includes a portion 15a positioned on the first side surface 10c and a portion 15b positioned on the second side surface 10d. The terminal electrode 15 does not reach the first main surface 10a. That is, a length of the portions 15a and 15b in the thickness direction T is preferably less than about ½ of the length of the multilayer capacitor main body 10 in the thickness direction T, and is more preferably equal to or less than about ⅓ of the length of the multilayer capacitor main body 10 in the thickness direction T, for example.

A dimension of the terminal electrode 15 in the length direction L of the second main surface is preferably from about 0.63 mm to about 0.67 mm, for example.

As shown in FIG. 8, the terminal electrode 15 is connected to the second inner electrodes 12. The terminal electrode 15 covers the exposed portion of the second extending portion 12b of each second inner electrode 12.

In addition, dimensions of the terminal electrodes 13, 14, and 15 in the length direction L of the second main surface can be measured by checking the second main surface of the capacitor main body at twenty-fold magnification by using a measurement microscope MH-60 manufactured by Nikon Corporation, for example. In this measurement, the longest portion of each of the terminal electrodes 13, 14 and 15 in the length direction L may be measured.

The terminal electrodes 16 to 18 are provided on the first main surface 10a. According to the present preferred embodiment, the terminal electrodes 16 and 17 respectively configure grounding terminal electrodes. The terminal electrode 18 configures a signal terminal electrode.

As shown in FIG. 1, the terminal electrode 16 is provided at a portion of the first main surface 10a on the side of the first end surface 10e (L(A) side) in the length direction L. The terminal electrode 16 extends across the first main surface 10a from an end portion on one side to an end portion on the other side in the width direction W. The terminal electrode 16 extends across the first and second side surfaces 10c and 10d and the first end surface 10e from the first main surface 10a. The terminal electrode 16 includes a portion 16a provided on the first side surface 10c, a portion 16b provided on the second side surface 10d, and a portion 16c provided on the first end surface 10e. The terminal electrode 16 does not reach the second main surface 10b. That is, the portions 16a to 16c do not reach the second main surface 10b. A length of the portions 16a to 16c in the thickness direction T is preferably less than about ½ of the length of the multilayer capacitor main body 10 in the thickness direction T, and is more preferably equal to or less than about ⅓ of the length of the multilayer capacitor main body 10 in the thickness direction T, for example.

As shown in FIGS. 5 and 7, the terminal electrode 16 is connected to the first inner electrodes 11. The terminal electrode 16 covers the exposed portion of the first extending portion 11a of each first inner electrode 11.

As shown in FIG. 1, the terminal electrode 17 is provided at a portion of the first main surface 10a on the side of the second end surface 10f (L(B) side) in the length direction. The terminal electrode 17 extends across the first main surface 10a from the end portion on one side to the end portion on the other side in the width direction W. The terminal electrode 17 extends across the first and second side surfaces 10c and 10d and the second end surface 10f from the first main surface 10a. The terminal electrode 17 includes a portion 17a provided on the first side surface 10c, a portion 17b provided on the second side surface 10d, and a portion 17c provided on the second end surface 10f. The terminal electrode 17 does not reach the second main surface 10b. That is, the portions 17a to 17c do not reach the second main surface 10b. A length of the portions 17a to 17c in the thickness direction T is preferably less than about ½ of the length of the multilayer capacitor main body 10 in the thickness direction T, and is more preferably equal to or less than about ⅓ of the length of the multilayer capacitor main body 10 in the thickness direction T, for example.

As shown in FIGS. 6 and 7, the terminal electrode 17 is connected to the first inner electrodes 11. The terminal electrode 17 covers the exposed portion of the second extending portion 11b of each first inner electrode 11.

As shown in FIG. 1, the terminal electrode 18 is provided at a portion of the first main surface 10a between the terminal electrode 16 and the terminal electrode 17 in the length direction L. The terminal electrode 18 extends across the first main surface 10a from the end portion on one side to the end portion on the other side in the width direction W. The terminal electrode 18 is spaced away from the terminal electrodes 16 and 17. The terminal electrode 18 extends across the first and second side surfaces 10c and 10d from the first main surface 10a. The terminal electrode 18 includes a portion 18a positioned on the first side surface 10c and a portion 18b positioned on the second side surface 10d. The terminal electrode 18 does not reach the second main surface 10b. That is, a length of the portions 18a and 18b in the thickness direction T is preferably less than about ½ of the length of the multilayer capacitor main body 10 in the thickness direction T, and is more preferably equal to or less than about ⅓ of the length of the multilayer capacitor main body 10 in the thickness direction T, for example.

As shown in FIGS. 4 and 8, the terminal electrode 18 is connected to the second inner electrodes 12. The terminal electrode 18 covers the exposed portion of the first extending portion 12a of each second inner electrode 12.

The terminal electrodes 13 to 18 can be respectively configured of appropriate metal such as Ni, Cu, Ag, Pd, Au, Sn, Cr, or Ag—Pd alloy, for example.

Figure 10:
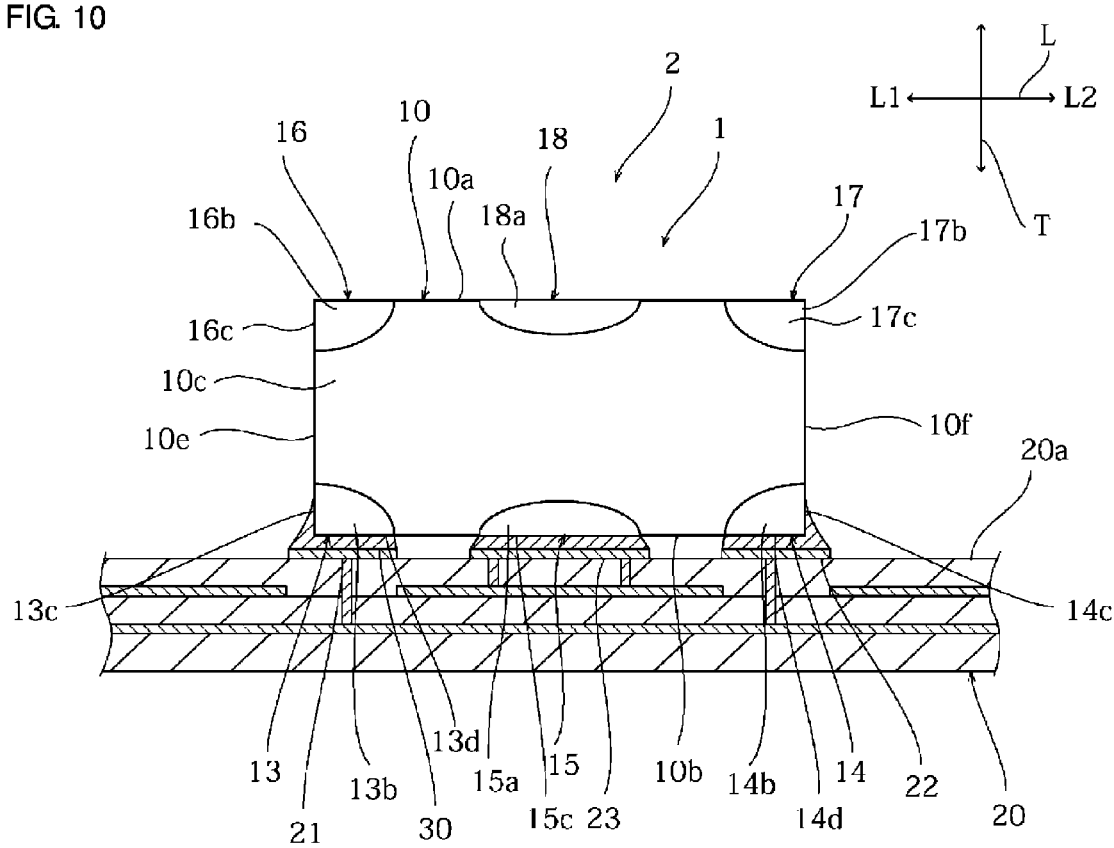
FIG. 10 is a schematic cross-sectional view of an installation structure of the multilayer capacitor according to the first preferred embodiment of the present invention.
Figure 11:
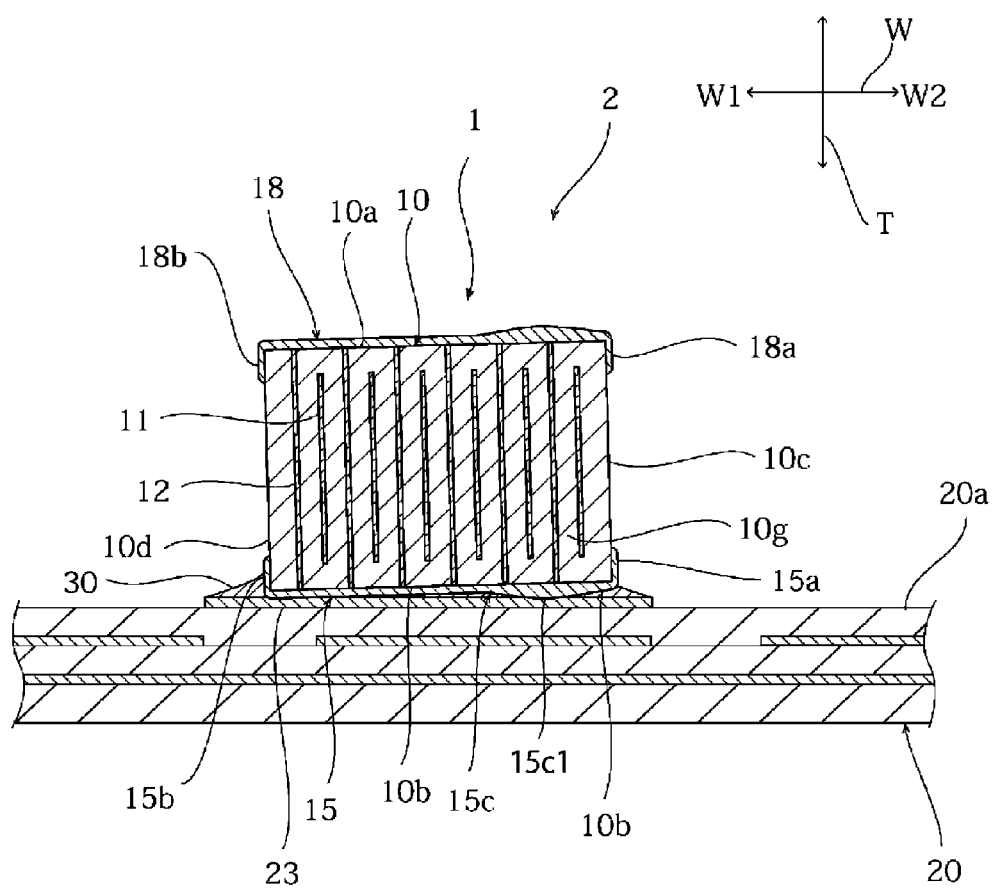
FIG. 11 is a schematic cross-sectional view of the installation structure of the multilayer capacitor according to the first preferred embodiment of the present invention.

FIGS. 10 and 11 are schematic cross-sectional views of an installation structure of the multilayer capacitor according to the present preferred embodiment. As shown in FIGS. 10 and 11, an installation structure 2 of the multilayer capacitor is provided with the multilayer capacitor 1 and an installation board 20. The multilayer capacitor 1 is installed on an installation surface 20a of the installation board 20. The installation board 20 includes first to third lands 21 to 23 provided on the installation surface 20a.

The first land 21 is electrically connected to the terminal electrode 13. The first land 21 extends to a farther outer side portion (L(A) side) than the terminal electrode 13 in the length direction L. That is, the first land 21 includes a portion which is positioned at an outer side portion of the multilayer capacitor 1 in a plan view (when viewed from the thickness direction T).

The second land 22 is electrically connected to the terminal electrode 14. The second land 22 extends to a farther outer side portion (L(B) side) than the terminal electrode 14 in the length direction L. That is, the second land 22 includes a portion which is positioned at an outer side portion of the multilayer capacitor 1 in a plan view (when viewed from the thickness direction T).

The third land 23 is electrically connected to the terminal electrode 15.

The lands 21 to 23 and the terminal electrodes 13 to 15 are joined to each other by a conductive material 30 and are electrically connected to each other. The conductive material 30 is not particularly limited as long as the conductive material 30 exhibits a conductive property. The conductive material 30 can be configured of a solder, for example.

The terminal electrodes can be formed by applying and baking conductive paste, for example. When the conductive paste is applied from one end to the other end in the width direction on the main surface, a center portion of each terminal electrode in the width direction W is generally thickest due to influences of gravity force and surface tension. For this reason, the multilayer capacitor is inclined to one side or the other side in the width direction W by setting the center portion of each terminal electrode in the width direction W as a supporting point when the multilayer capacitor is installed. Therefore, an installation posture of the multilayer capacitor varies. If the installation posture of the multilayer capacitor varies, there is a concern about variation of characteristics of the multilayer capacitor after the installation thereof.

As shown in FIGS. 4 to 6, the terminal electrodes 13 to 15 in the multilayer capacitor 1 respectively have the thickest portions on the second main surface 10b on a W2 side in the width direction W. Therefore, the multilayer capacitor 1 is installed in a state where a total of six points, namely the thickest portions 13c1, 14c1, and 15c1 of the portions 13d, 14c, and 15d, which are positioned on the second main surface 10b, on the W2 side and the end portions of the terminal electrodes 13 to 15 on a W(A) side are in contact with the installation board 20 as shown in FIG. 11.

Therefore, the multilayer capacitor 1 may be tilted when it is installed on the installation board 20. Also, it is possible to reduce variations in the installation posture of the multilayer capacitor 1. Accordingly, it is possible to significantly reduce or prevent variations in the characteristics of the multilayer capacitor 1 after the installation.

As for thicknesses of the terminal electrodes 13 to 15, cross sections of the terminal electrodes 13 to 15 are exposed by polishing from the first side surface 10c of the multilayer capacitor 1 toward the center of the width direction. It is possible to measure the thicknesses of the terminal electrodes 13 to 15 by removing sag caused by the polishing and then observing the cross sections thereof by using a microscope.

In addition, a portion of the terminal electrode 15 with the largest thickness in the width direction W can be checked by measuring a thickness of a cross section which appears after polishing the multilayer capacitor 1 from the first end surface 10e or the second end surface 10f toward the terminal electrode 15, for example.

In addition, a portion of the first terminal electrode 13 with the largest thickness in the width direction W can be checked by measuring a thickness of a cross section which appears after polishing the multilayer capacitor 1 from the first end surface 10e toward the first terminal electrode 13, for example.

In addition, a portion of the second terminal electrode 14 with the largest thickness in the width direction W can be checked by measuring a thickness of a cross section which appears after polishing the multilayer capacitor 1 from the second end surface 10f toward the second terminal electrode 14, for example.

Incidentally, it is preferable to set a current loop to be short from a viewpoint of reducing equivalent series inductance (ESL) of the installed multilayer capacitor 1. Therefore, it is preferable to set the widths of the exposed portions of the extending portions 11c, 11d, and 12b in the length direction L to be wide. However, since distances between the outer border of the terminal electrodes, the border between the signal terminal electrode and the multilayer capacitor main body 10, to each of the extending portions decrease if the widths of the exposed portions of the extending portions 11c, 11d, and 12b are widened, moisture easily enters the extending portions. Therefore, there is a tendency in that moisture resistance deteriorates.

As a result of intensive study, the present inventors discovered that in a case where the inner electrodes 12 and the outer electrode 15 were connected to a positive pole and the inner electrodes 11 and the outer electrodes 13 and 14 were connected to a negative pole, the moisture resistance did not easily deteriorate on the negative pole side even if distances from the outer borders of the terminal electrodes 13 and 14 to the exposed portions of the extending portions 11c and 11d were short while the moisture resistance deteriorated on the positive pole side if a distance from the outer borders of the terminal electrode 15 to the exposed portions of the extending portion 12b was short.

That is, since the multilayer capacitor 1 satisfies Equations (1) to (4), which are described in more detail below, it is possible to significantly reduce the ESL of the installed multilayer capacitor 1 while maintaining excellent moisture resistance of the multilayer capacitor 1.

As shown in FIG. 7, L1 represents a dimension of the exposed portion of the third extending portion 11c of at least one of the first inner electrodes 11 in the length direction L.

As shown in FIG. 7, L(B) represents the dimension of the exposed portion of the fourth extending portion 11d of at least one of the first inner electrodes 11 in the length direction L.

As shown in FIG. 8, L3 represents a dimension of the exposed portion of the second extending portion 12b of at least one of the second inner electrodes 12 in the length direction L.

As shown in FIG. 7, L4 represents a distance in the length direction L from an inner edge (right edge in FIG. 7) of the exposed portion of the third extending portion 11c of the at least one of the first inner electrodes 11 to an inner edge (right edge in FIG. 7) of the portion 13d of the grounding terminal electrode 13 that covers the exposed portion of the extending portion 11c. In this case, the inner edge of the exposed portion of the third extending portion 11c and the inner edge of the portion 13d are the respective edges closest to the terminal electrode 15.

As shown in FIG. 7, L5 represents a distance in the length direction L from an inner edge (left edge in FIG. 7) of the exposed portion of the fourth extending portion 11d of the at least one of the internal electrodes 11 to the inner edge (left edge in FIG. 7) of the portion 14d of the grounding terminal electrode 14 that covers the exposed portion of the fourth extending portion 11d. In this case, the inner edge of the exposed portion of the fourth extending portion 11d and the inner edge of the portion 14d are the respective edges closest to the terminal electrode 15.

As shown in FIG. 8, L6 represents a distance in the length direction L from an edge (left edge in FIG. 8) of the exposed portion of the second extending portion 12b of the at least one of the internal electrodes 12 to an edge (left edge in FIG. 8) of a portion 15c of the grounding terminal electrode 15 that covers the exposed portion of the extending portion 12b. In this case, the edge of the exposed portion of the second extending portion 12b and the edge of the portion 15c are the respective edges closest to the terminal electrode 13.

As shown in FIG. 8, L7 represents a distance from an edge (right edge in FIG. 8) of the exposed portion of the second extending portion 12b of the at least one of the internal electrodes 12 to an edge (right edge in FIG. 8) of the portion 15c. In this case, the edge of the exposed portion of the second extending portion 12b and the edge of the portion 15c are the respective edges closest to the terminal electrode 14.

Equations (1) to (4) preferably are as follows:

$$L3 > L1 \quad (1)$$

$$L3 > L2 \quad (2)$$

$$L6 > L4 \quad (3)$$

$$L7 > L5 \quad (4)$$

In addition, the reason that the moisture resistance does not easily deteriorate on the side of the negative pole 11 even if the distances from the inner edges of the terminal electrodes 13 and 14 to the inner edges of the exposed portions of the extending portions 11c and 11d are short while the moisture resistance deteriorates on the side of the positive pole 12 if the distance from the left and right edges of the terminal electrode 15 to the left and right edges of the exposed portions of the extending portion 12b is short can be considered as follows. If water enters the inside of the multilayer capacitor, protons (H$^+$)are generated as represented by the following Equation (5). The reaction of Equation (5) occurs only on the positive side and does not occur on the negative side. If protons generated at the positive pole move to the negative pole, then insulation resistance (IR) of the multilayer capacitor decreases.

$$H_2O \rightarrow H^+ + \tfrac{1}{2}O_2 + 2e^- \quad (5)$$

Therefore, if it is possible to significantly reduce or prevent generation of protons at the positive pole, then it is possible to significantly reduced or prevent a decrease in insulation resistance (IR). For this reason, it is possible to improve the moisture resistance of the multilayer capacitor. Accordingly, the moisture resistance does not deteriorate even if the distances from the inner edges of the terminal electrodes 13 and 14 to the inner edges of the extending portions 11c and 11d are short and moisture can easily reach the negative pole 11. In contrast, the moisture resistance deteriorates if the distance from the left and right edges of the terminal electrode 15 to the left and right edges of the exposed portions of the extending portion 12b is short since moisture can easily reach the positive pole 12.

EXPERIMENTAL EXAMPLES 1 to 4

Thirty six non-limiting examples of multilayer capacitors with the same or substantially the same configuration as that of the multilayer capacitor 1 according to the above-described preferred embodiment were produced under the following conditions. A voltage of 4 V was applied to the produced samples for 500 hours in an environment at a temperature of 85° C. and a humidity of 85% RH. Thereafter, insulation resistance (IR) was measured. As a result, samples with logIR under about $10^{5.7}$ were determined to be defective products, and samples with logIR of equal to or greater than about $10^{5.7}$ were determined to be non-defective products. The results are shown in Table 1.

Size of multilayer capacitor: 2.0 mm (L)×1.25 mm (W)× 0.7 mm (T)

Design Values

Ceramics: BaTiO$_3$

Capacitance: 47 μF

Rated voltage: 4 V

Configuration of terminal electrodes: first layer: Cu-fused electrode, second layer; Ni-plated film, third layer: Sn-plated film

TABLE 1

| | L4, L5 (μm) | L6, L7 (μm) | L1, L2 (μm) | L3 (μm) | ESL (pH) | Number of events of IR deterioration/ number of samples |
|---|---|---|---|---|---|---|
| Example 1 | 70 | 90 | 250 | 500 | 47.0 | 0/36 |
| Example 2 | 70 | 75 | 250 | 530 | 45.5 | 0/36 |
| Comparative Example 1 | 70 | 10 | 250 | 500 | 47.0 | 2/36 |
| Comparative Example 2 | 70 | 180 | 250 | 240 | 60.0 | 0/36 |

TABLE 1-continued

| | L4, L5 (μm) | L6, L7 (μm) | L1, L2 (μm) | L3 (μm) | ESL (pH) | Number of events of IR deterioration/ number of samples |
|---|---|---|---|---|---|---|
| Comparative Example 3 | 70 | 160 | 250 | 230 | 60.5 | 0/36 |

Based on the results shown in Table 1, it is possible to realize both a decrease in ESL and an improvement in reliability by satisfying L>L1, L3>L2, L6>L4, and L7>L5, for example.

Incidentally, if the installation board 20 is bent in the length direction L, stress concentrates on contact points (see FIG. 7, for example) between the second main surface 10b and the inner edges of the portions 13d and 14d of the terminal electrodes 13 and 14 in the length direction L. Therefore, cracking easily occurs in the multilayer capacitor main body 10 from the contact points between the second main surface 10b and the inner edges of the portions 13d and 14d of the terminal electrodes 13 and 14 in the length direction L as start points.

In the multilayer capacitor 1, portions of the terminal electrodes 13 and 14 on at least the W2 side in the width direction W include portions 13d2 and 14d2 which project toward the center of multilayer capacitor main body 10 along the length direction L as shown in FIG. 9. Therefore, the stress applied to the multilayer capacitor main body 10 at the contact points between the tip end portions of the portions 13d and 14d and the second main surface 10b when the installation board 20 is bent in the length direction L is dispersed in the width direction W. For this reason, the stress does not easily concentrate on a specific portion or one location of the multilayer capacitor main body 10. Accordingly, cracking does not easily occur in the multilayer capacitor main body 10.

In addition, the terminal electrodes 13 and 14 according to the present preferred embodiment can be formed by applying conductive paste and then drying ceramic element assemblies in a state of being inclined such that the W2 side is located at a lower side than the W(A) side in the width direction W, for example.

In addition, it is possible to form the terminal electrodes 13 and 14 to be thicker than the terminal electrode 15 by setting the number of times of the application of the conductive paste for the formation of the terminal electrodes 13 and 14 to be larger than the number of times of the application of the conductive paste for the formation of the terminal electrode 15.

As for the thicknesses of the terminal electrodes 13 to 15, cross sections thereof are exposed by polishing the multilayer ceramic capacitor from the side surfaces to the center of the width direction until the width thereof becomes half. It is possible to measure the thicknesses by removing sag caused by the polishing and then observing the cross sections.

If the terminal electrode 15 is thicker than the terminal electrodes 13 and 14, the multilayer ceramic capacitor can be easily installed so as to be parallel or substantially parallel with the installation board. Therefore, it is possible to reduce the height of the multilayer ceramic capacitor, which is installed on the installation board, in a normal direction of the installation board.

Figure 23:
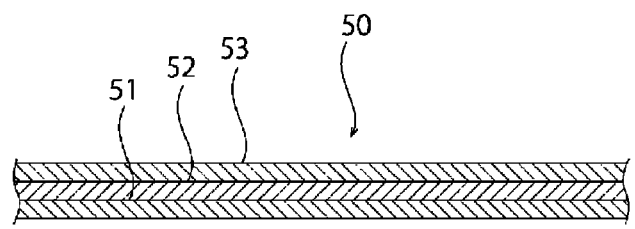
FIG. 23 is a schematic cross-sectional view showing a portion of the terminal electrode.

In the following description, the terminal electrodes 13 to 18 will be collectively referred to as a terminal electrode 50 in some cases. As shown in FIG. 23, the terminal electrode 50 is preferably configured as a multilayer body of a baked electrode layer 51, an Ni-plated film 52 provided on the baked electrode layer 51, and an Sn-plated film 53 provided on the Ni-plated film 52.

If the plated film 52 of each of the terminal electrodes 13 and 14 is thicker than the plated film 52 of the terminal electrode 15, a self-alignment effect by the terminal electrodes 13 and 14 is achieved. Therefore, the multilayer ceramic capacitor is not easily rotated about the position of the terminal electrode 15, does not easily deviate from a desired installation position, and is capable of being stably installed. Therefore, it is possible to connect the terminal electrodes 13 and 14 to the lands of the installation board. According to the multilayer ceramic capacitor, it is thus possible to significantly reduce or prevent an increase in the equivalent series inductance (ESL) after the installation on the installation board.

A thickness of the Ni-plated film 52 of the terminal electrode 15 is preferably equal to or greater than about 2 μm and equal to or less than about 3 μm, and a thickness of the Sn-plated film is preferably equal to or greater than about 4 μm and equal to or less than about 5 μm, for example. A total thickness of the plated films 52 and 53 of the terminal electrode 15 is preferably equal to or greater than about 6 μm and equal to or less than about 8 μm, for example.

A thickness of the Ni-plated film 52 of each of the terminal electrodes 13 and 14 is preferably equal to or greater than about 4 μm and equal to or less than about 5 μm, and a thickness of the Sn-plated film is preferably equal to or greater than about 5 μm and equal to or less than about 6 μm, for example. A total thickness of the plated films 52 and 53 of each of the terminal electrodes 13 and 14 is preferably equal to or greater than about 9 μm and equal to or less than about 11 μm, for example.

The Sn-Plated Film is not Necessarily Provided.

The thickness of the plated film may be measured by polishing the side surfaces of the multilayer ceramic capacitor in the width direction until the thickness of the multilayer capacitor main body 10 becomes half or about half and then observing a cross section obtained after removing polishing sag, for example.

Incidentally, stress is applied to the multilayer capacitor 1 when the installation board 20 is bent in the width direction W or during reflow. The stress applied to the multilayer capacitor 1 easily concentrates on portions of the capacitor main body 10 at which the portions 13c and 14c of the terminal electrodes 13 and 14 positioned on the end surfaces 10e and 10f are in contact with the end surfaces 10e and 10f. Therefore, cracking easily occurs in the capacitor main body 10 from the portions at which the portions 13c and 14c are in contact with the end surfaces 10e and 10f.

In the multilayer capacitor 1, the portion 13c of the terminal electrode 13, which is positioned on the first end surface 10e, and the portion 14c of the terminal electrode 14, which is positioned on the second end surface 10f, are positioned beyond a region where the first effective portion 11A and the second effective portion 12A face each other in the width direction W. In other words, the length of the portion 13c of the terminal electrode 13 provided on the first end surface 10e in the thickness direction T is longer than the length of the third extending portion 11c in the thickness direction T. And the length of the portion 14c of the terminal electrode 14 provided on the second end surface 10f in the thickness direction T is longer than the length of the third extending portion 11d in the thickness direction T. That is, the portions 13c and 14c are overlapped with the portion in which the first effective portion 11A and the second effective portion 12A face each other in the width direction W, in the thickness direction T. Therefore, cracking does not easily occur in the capacitor main body 10 from the portion where the portions 13c and 14c are in contact with the end surfaces 10e and 10f. The reason will be considered as follows.

During baking, the amount of contraction of the conductive paste layer is greater than the amount of contraction of a ceramic green sheet. Therefore, compression stress in a region where an amount of the conductive paste layer per unit volume is large relatively increases, and compression stress in a region where a presence rate of the conductive paste layer per unit area is low relatively decreases. Specifically, compression stress in a region where the extending portions 11c, 11d, and 12b is present in the thickness direction T is relatively small, and compression stress in a region where the first and second effective portions 11A and 12A are present in the thickness direction T is relatively large. Therefore, if the portions where the portions 13c and 14c are in contact with the end surfaces 10e and 10f are positioned in the region where the extending portions 11c, 11d, and 12b are present in the thickness direction T, tension stress easily occurs at the portions where the portions 13c and 14c are in contact with the end surfaces 10e and 10f. Therefore, cracking easily occurs. In contrast, if the portions where the portions 13c and 14c are in contact with the end surfaces 10e and 10f are positioned in the region in which the first effective portion 11A and the second effective portion 12A face each other in the width direction W, and which has large compression stress, in the thickness direction T as in the multilayer capacitor 1, tension stress does not easily occur at the portions where the portions 13c and 14c are in contact with the end surfaces 10e and 10f. Accordingly, cracking does not easily occur.

In addition, the positional relationship between the portions 13c and 14c and the effective portions 11A and 12A can be checked by observing a cross section, which appears after polishing the multilayer ceramic capacitor 1 from the first side surface or the second side surface in the width direction, at twenty-fold magnification by using a measurement microscope MM-60 manufactured by Nikon Corporation, for example.

In addition, a length of each of the portions 13c and 14c in the thickness direction T is preferably equal to or greater than about 0.12 mm and equal to or less than about 0.20 mm, for example.

In addition, each of a dimension of the first inner electrode 11 from an outer edge of the third extending portion 11c to the first end surface 10e and a dimension of the first inner electrode 11 from an outer edge of the fourth extending portion 11d to the second end surface 10f is preferably equal to or greater than about 0.04 mm and equal to or less than about 0.08 mm, for example.

Hereinafter, another preferred embodiment of the present invention will be described. In the following description, the same reference numerals will be given to members with the same or substantially the same functions as those in the first preferred embodiment, and the descriptions thereof will be omitted.

Second Preferred Embodiment

Figure 12:
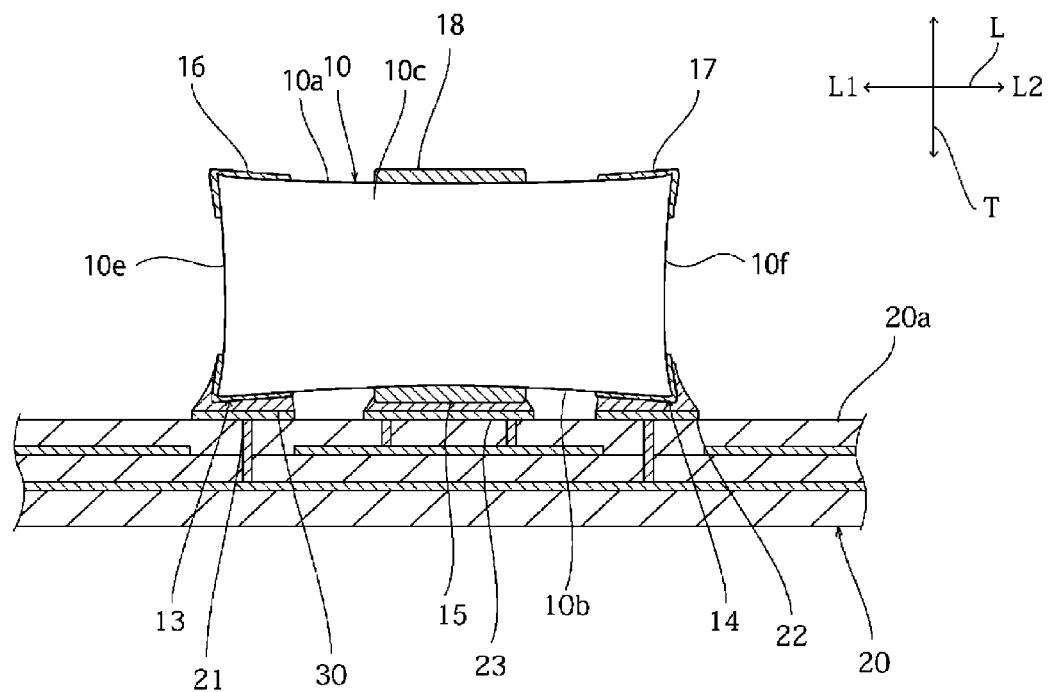
FIG. 12 is a schematic cross-sectional view of an installation structure of a multilayer capacitor according to a second preferred embodiment of the present invention.
Figure 13:
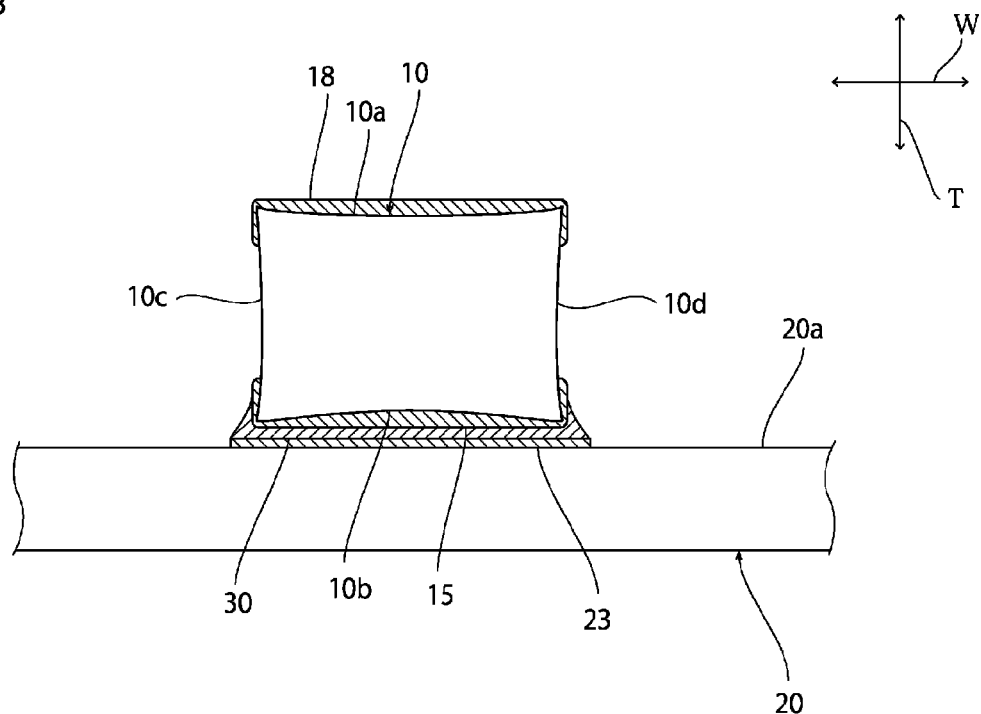
FIG. 13 is a schematic cross-sectional view of the installation structure of the multilayer capacitor according to the second preferred embodiment of the present invention.

FIGS. 12 and 13 are schematic cross-sectional views of an installation structure of a multilayer capacitor according to a second preferred embodiment of the present invention. According to the multilayer capacitor 1, the second main surface 10b and the first and second end surfaces 10e and 10f preferably are concave surfaces, and the first and second side surfaces 10c and 10d preferably are convex surfaces (abbreviated in the figure). Specifically, the second main surface 10b which faces the installation surface 20a is depressed from the ends toward the center in the length direction L and is depressed from the ends toward the center in the width direction W.

Therefore, if all the terminal electrodes 13 to 15 have the same or substantially the same thicknesses, a distance between the terminal electrode 15 and the land 23 positioned at the center in the length direction L becomes longer than a distance between the terminal electrode 13 and the land 21 and a distance between the terminal electrode 14 and the land 22. Therefore, there is a concern in that the connection between the terminal electrode 15 and the land 23 is not reliably established or electrical resistance increases.

According to the multilayer capacitor of the preferred embodiment, the portion of the terminal electrode 15 on the second main surface 10b with the largest thickness in the width direction W is thicker than the portions of the first and second terminal electrodes 13 and 14 with the largest thicknesses in the width direction W. Therefore, the distance between the terminal electrode 15 and the land 23 is short. Accordingly, it is possible to reliably connect the terminal electrode 15 to the land 23 and to reduce the electrical resistance between the terminal electrode 15 and the land 23. That is, the multilayer capacitor 1 has an excellent installation property.

Third Preferred Embodiment

Figure 14:
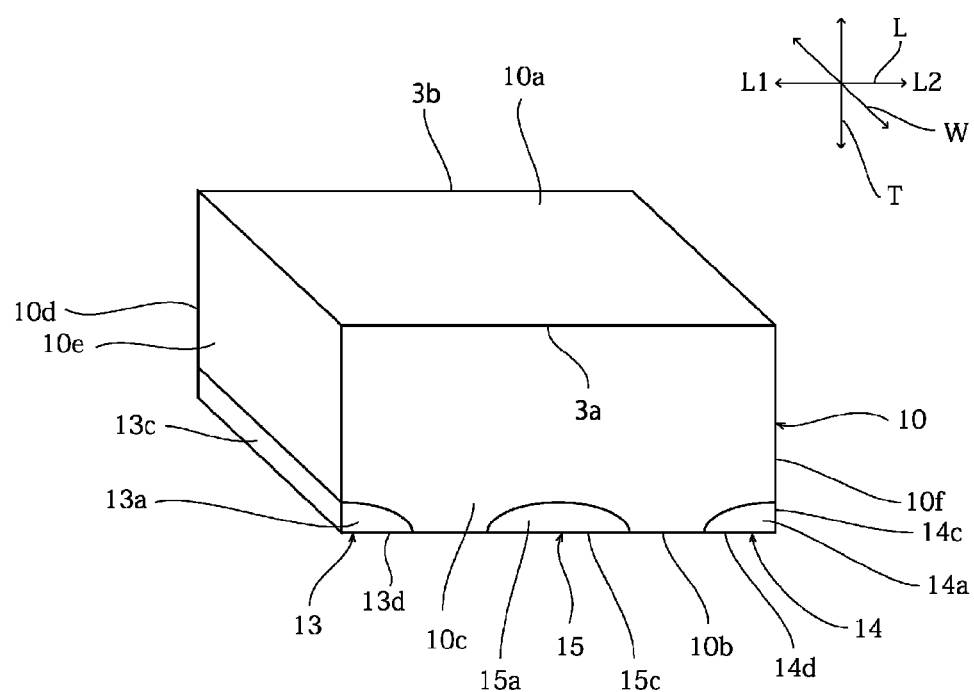
FIG. 14 is a schematic perspective view of a multilayer capacitor according to a third preferred embodiment of the present invention.
Figure 15:
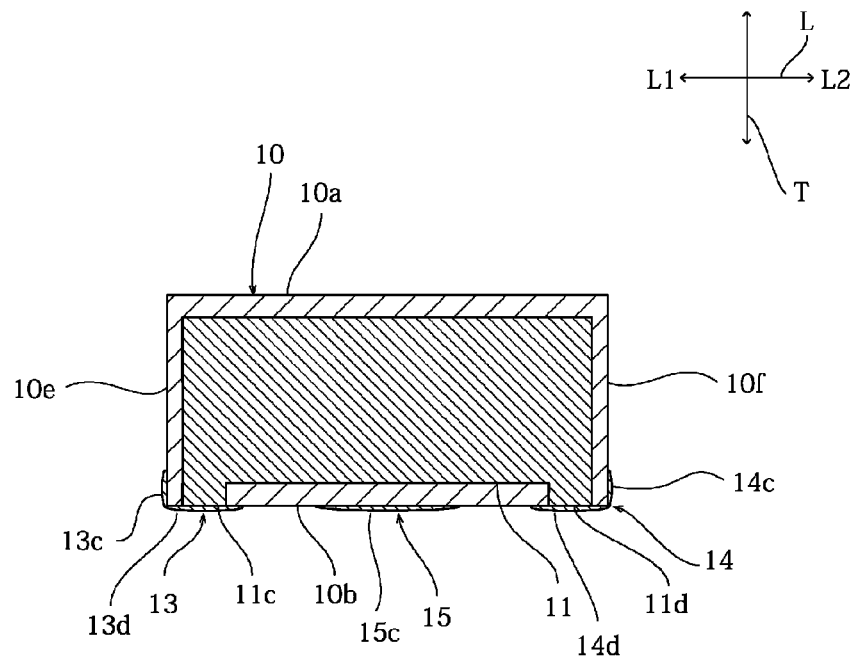
FIG. 15 is a schematic cross-sectional view of the multilayer capacitor according to the third preferred embodiment of the present invention.
Figure 16:
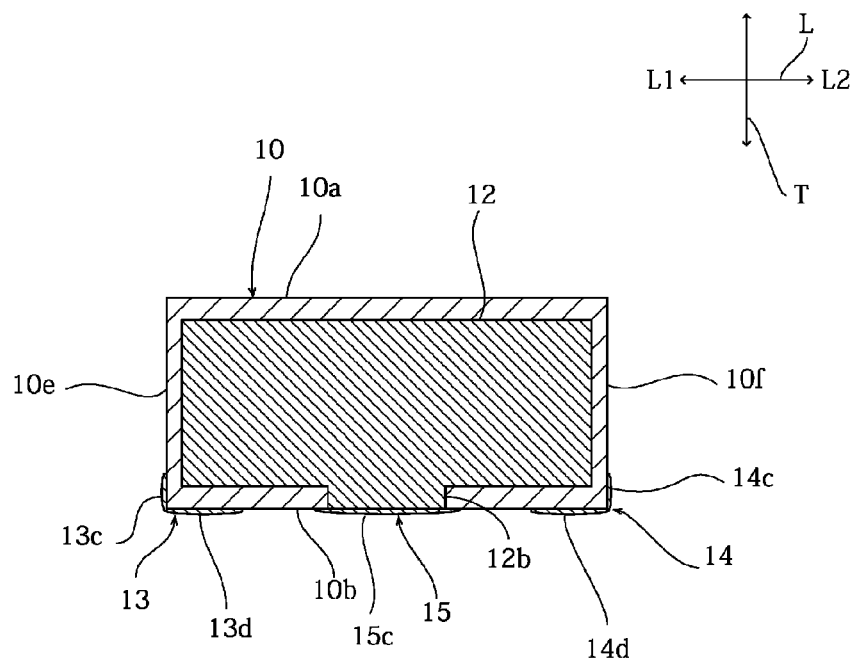
FIG. 16 is a schematic cross-sectional view of the multilayer capacitor according to the third preferred embodiment of the present invention.
Figure 17:
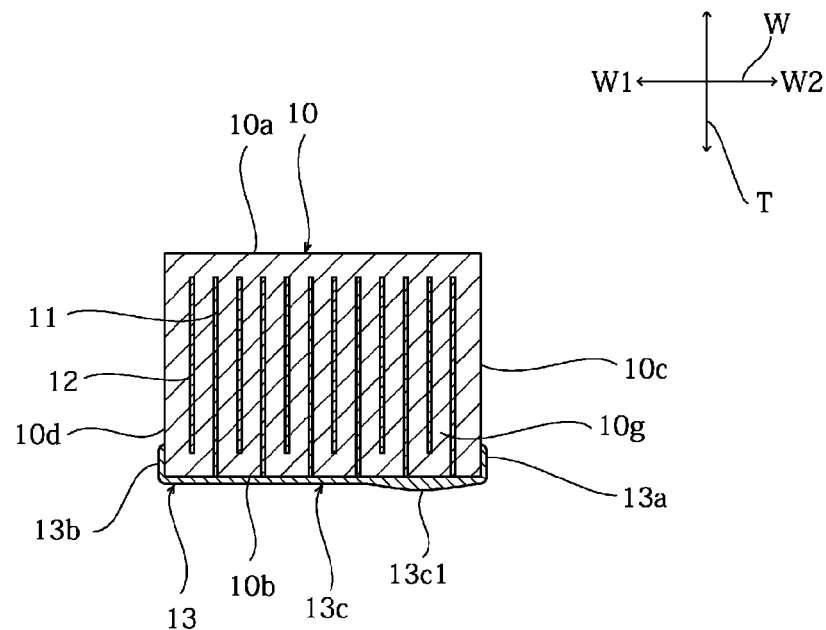
FIG. 17 is a schematic cross-sectional view of the multilayer capacitor according to the third preferred embodiment of the present invention.
Figure 18:
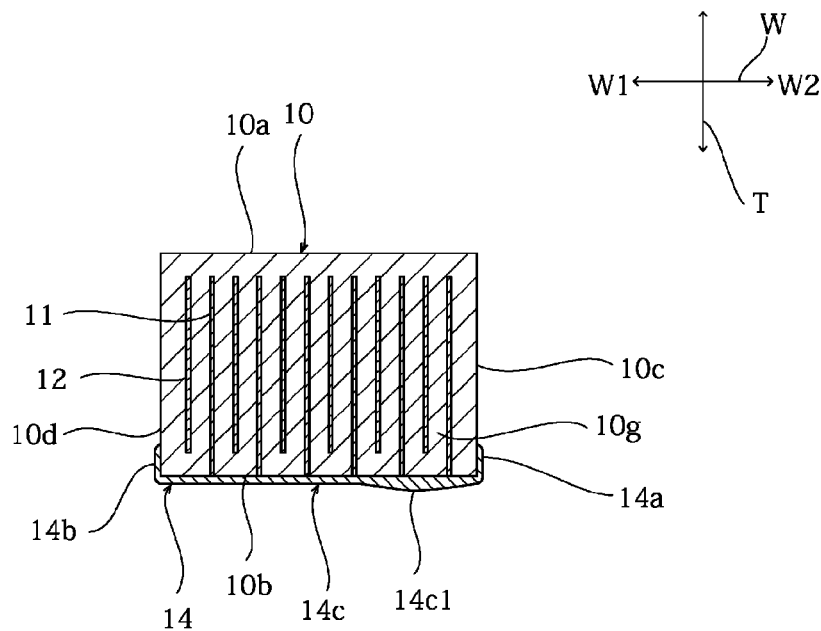
FIG. 18 is a schematic cross-sectional view of the multilayer capacitor according to the third preferred embodiment of the present invention.

FIG. 14 is a schematic perspective view of a multilayer capacitor according to a third preferred embodiment of the present invention. FIGS. 15 to 18 are schematic cross-sectional views of the multilayer capacitor according to the third preferred embodiment.

The first preferred embodiment was described as the example in which the terminal electrodes 16 to 18 were provided on the side of the first main surface 10a in addition to the terminal electrodes 13 to 15. However, the present invention is not limited to that configuration.

As shown in FIGS. 14 to 18, for example, only three terminal electrodes, namely the terminal electrodes 13 to 15 may be provided as terminal electrodes on the side of the second main surface 10b.

The first main surface 10a as an upper surface of the multilayer ceramic capacitor 1 is polished such that corner portions of ridge portions 3a and 3b in the length direction L are rounded. Curvature radii of the ridge portions 3a and 3b are preferably equal to or less than about 70 μm and are more preferably equal to or greater than about 30 μm and equal to or less than about 70 μm, for example.

Portions of unbaked ceramic element assemblies on a side of the installation surface 20a are subjected to barrel polishing for a predetermined period of time in a state of being held by a holder (not shown) until the curvature radii of the ridge portions 3a and 3b become about 70 μm, for example. Thereafter, sandblast polishing may be further performed thereon.

Here, a method of determining polishing conditions for the barrel polishing and the sandblast polishing is not particularly limited. Samples of the ceramic element assemblies may be produced, and the curvature radii may be measured by the following method. As a measurement instrument of the curvature radii, KEYENCE digital microscope VHX series can be used, for example.

Portions of the samples on the side of the installation surface (second main surface 10b) are solidified with resin. Thereafter, the ridge portions 3a and 3b are subjected to the barrel polishing and the sandblast polishing for a predetermined period of time.

Then, the polished ridge portions 3a and 3b are observed by the measurement instrument, and start points and end points of the ridge portions are designated. Thereafter, center points between the start points and the end points are designated.

Then, circles which passes through the start points, the center points, and the end points are depicted, and radii of the circles are calculated as the curvature radii (R amount).

EXPERIMENTAL EXAMPLE

Multilayer ceramic capacitors with the same or substantially the same configuration as that in the above-described preferred embodiment were produced. Then, an experiment for checking adsorption errors and presence of chipping-off and breakage of the produced sample was conducted.

The multilayer ceramic capacitors produced as the samples had a dimension in the length direction L of equal to or greater than about 2.00 mm and equal to or less than about 2.10 mm, a dimension in the height direction T of equal to or greater than about 0.7 mm and equal to or less than about 1.0 mm, and a dimension in the width direction W of equal to or greater than about 1.20 mm and equal to or less than about 1.40 mm.

The adsorption errors were evaluated by causing the multilayer ceramic capacitors to be adsorbed by an adsorption nozzle and counting the number of multilayer ceramic capacitors which dropped off. The number of multiple ceramic capacitors as targets of the adsorption error evaluation was 10000 for each curvature radius. The results are shown in Table 2.

The presence of chipping-off and breakage was evaluated by counting the number of events, in which chipping-off and breakage occurred, by causing the multilayer ceramic capacitors to be adsorbed by the adsorption nozzle. The number of multiple ceramic capacitors as targets of the chipping-off and breakage evaluation was 100 for each curvature radius. The results are shown in Table 2.

TABLE 2

| | R amount (μm) | | | | | | | |
|---|---|---|---|---|---|---|---|---|
| | 20 | 30 | 40 | 50 | 60 | 70 | 80 | 90 |
| Adsorption errors (number of events/number of evaluation targets) | 0/10000 | 0/10000 | 0/10000 | 0/10000 | 0/10000 | 0/10000 | 5/10000 | 7/100000 |
| Chipping-off and breakage (number of events/number of evaluation targets) | 5/100 | 0/100 | 0/100 | 0/100 | 0/100 | 0/100 | 0/100 | 0/100 |

According to Table 2, no adsorption error occurred under a condition in which the R amount was equal to or greater than about 20 μm and equal to or less than about 70 μm. In contrast, five adsorption errors occurred in a case where the R amount was about 80 μm, and seven adsorption errors occurred in a case where the R amount was about 90 μm.

According to Table 2, no chipping-off and breakage occurred under a condition in which the R amount was equal to or greater than about 30 μm and equal to or less than about 90 μm. In contrast, chipping-off and breakage occurred five times in a case where the R amount was about 20 μm.

Therefore, it is possible to avoid occurrence of adsorption errors, chipping-off, and breakage by setting the R amount to be equal to or greater than about 30 μm and equal to or less than about 70 μm, for example.

Fourth Preferred Embodiment

Figure 19:
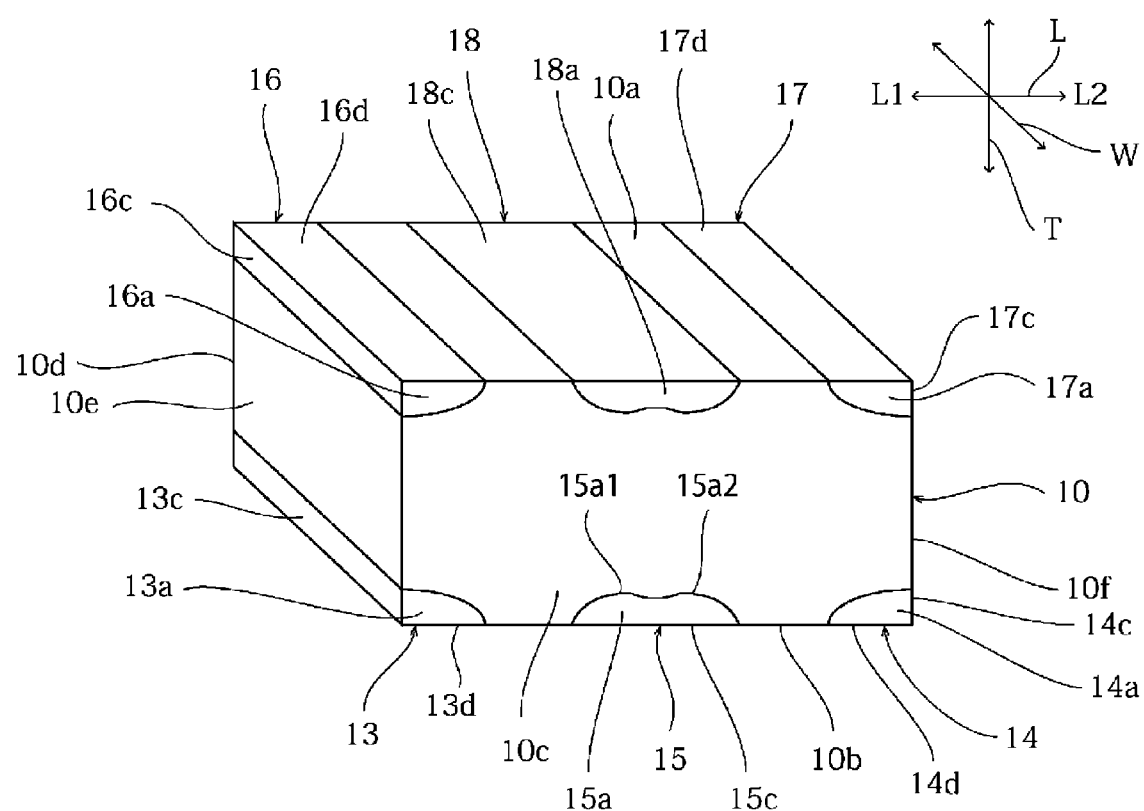
FIG. 19 is a schematic perspective view of a multilayer capacitor according to a fourth preferred embodiment of the present invention.
Figure 20:
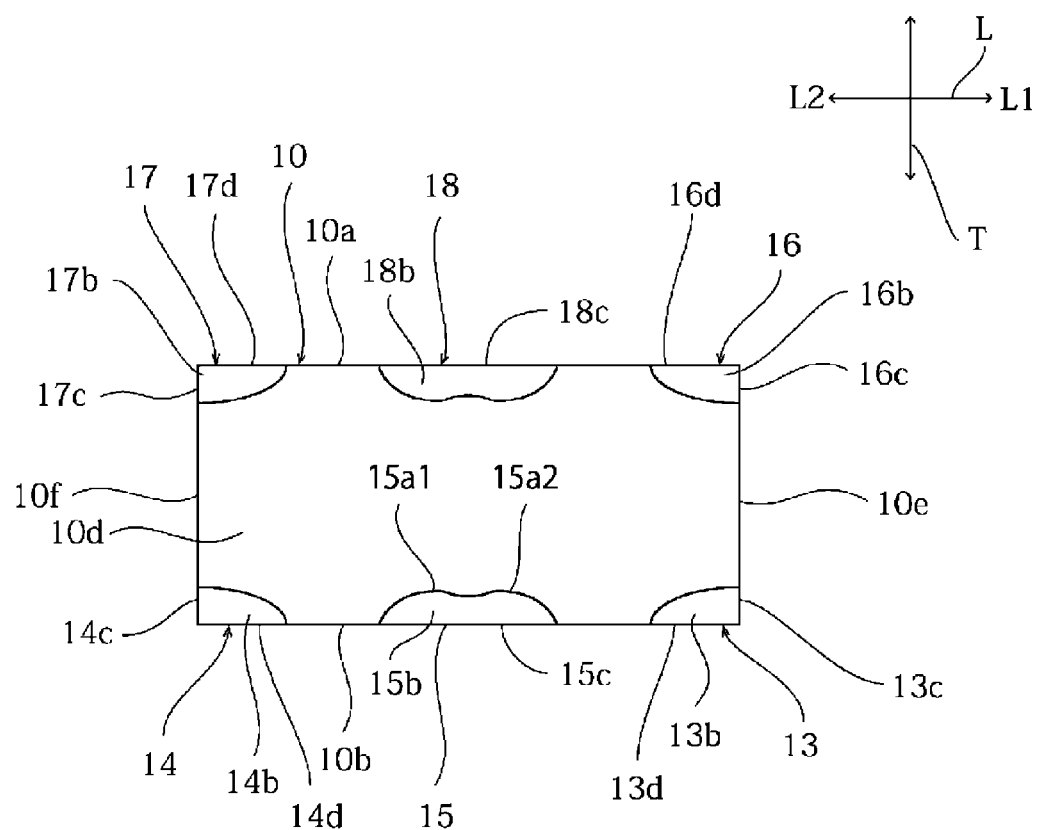
FIG. 20 is a schematic front view of a second side surface of the multilayer capacitor according to the fourth preferred embodiment of the present invention.
Figure 21:
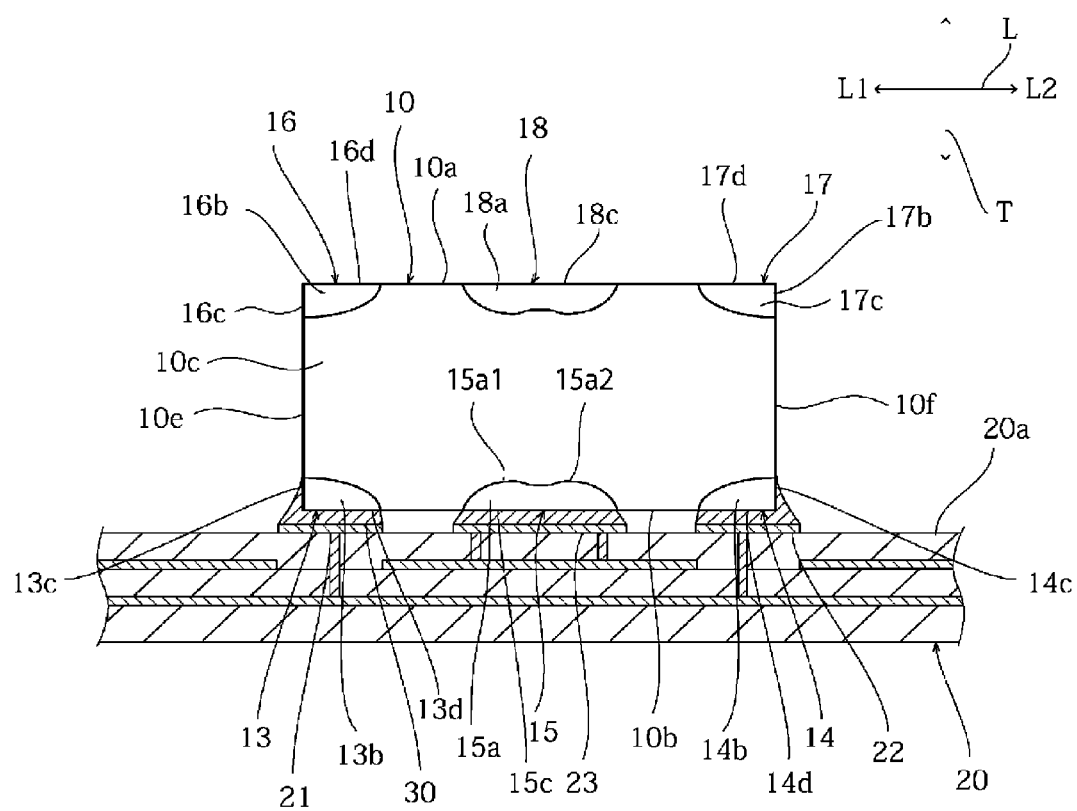
FIG. 21 is a schematic cross-sectional view of an installation structure of the multilayer capacitor according to the fourth preferred embodiment of the present invention.
Figure 22:
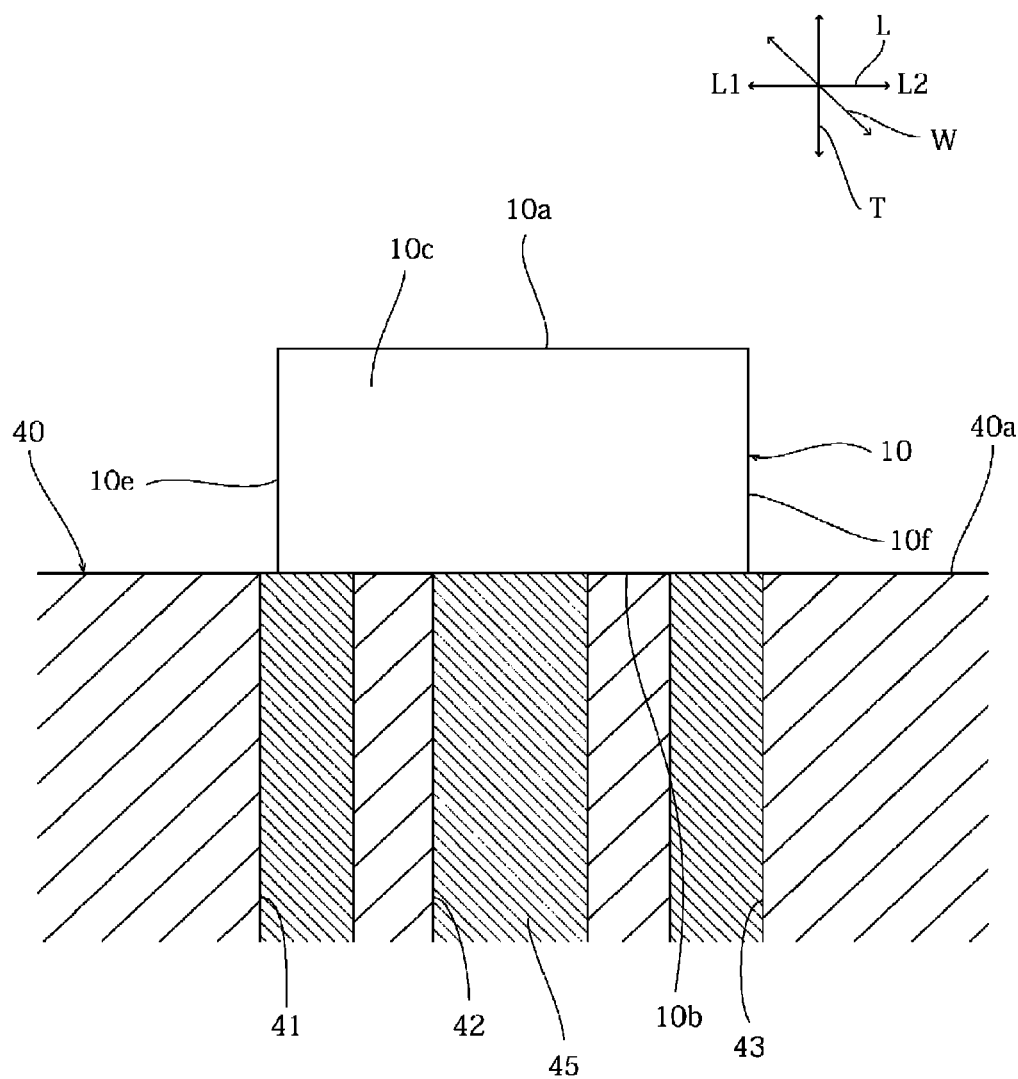
FIG. 22 is a schematic cross-sectional view illustrating a process of forming a terminal electrode.

FIG. 19 is a schematic perspective view of a multilayer capacitor according to a fourth preferred embodiment of the present invention. FIG. 20 is a schematic front view of a second side surface of the multilayer capacitor according to the fourth preferred embodiment. FIG. 21 is a schematic cross-sectional view of an installation structure of the multilayer capacitor according to the fourth preferred embodiment. FIG. 22 is a schematic cross-sectional view illustrating a process of forming a terminal electrode.

Stress is applied to the multilayer capacitor 1 if the installation board is bent in the width direction W. The stress applied to the multilayer capacitor 1 easily concentrates at a location between a portion of the outer periphery of the portion 15a of the signal terminal electrode 15 extending in the thickness direction and the side surface 10c, and a portion of the outer periphery of the portion 15b of the signal terminal electrode 15 extending in the thickness direction and the side surface 10d. Therefore, cracking easily occurs in the capacitor main body 10 from the portion of the signal terminal electrode 15 on the capacitor main body 10, which is in contact with the outer peripheries of the portions 15a, 15b of the signal terminal electrode 15 positioned on the side surfaces 10c and 10d, respectively.

As shown in FIGS. 19 and 21, the outer periphery of the portion 15a includes a plurality of convex portions 15a1 and 15a2 which extend from a bottom edge of the side surface 10c toward the first main surface 10a. Therefore, the stress which is applied to the capacitor main body 10 when the installation board is bent is dispersed to the convex portions 15a1 and 15a2. Accordingly, it is possible to significantly reduce or prevent application of large stress to a single location in the capacitor main body 10. As a result, it is possible to effectively significantly reduce or prevent occurrence of cracking in the capacitor main body 10.

From the viewpoint of effectively reducing or preventing an occurrence of cracking in the capacitor main body 10, the convex portions 15a1 and 15a2 preferably have curved or substantially curved peripheries when viewed from the width direction W.

In addition, the terminal electrode 15, in which the outer peripheries of the portions 15a and 15b include the plurality of convex portions 15a1 and 15a2 extending from the bottom edge of the side surface 10c toward the side of the first main surface 10a, can be manufactured by the following procedure. As shown in FIG. 22, grooves 41 to 43 which open in a surface 40a of a substrate 40 made of an elastic body such as rubber are filled with conductive paste 45 to form the terminal electrodes 13 to 15. It is possible to form the terminal electrodes 13 to 15 by pressing the capacitor main body 10 against the surface 40a of the substrate 40 in this state. It is possible to form the terminal electrode 15 including the plurality of convex portions 15a1 and 15a2 by reducing the pressing amount of the capacitor main body 10 against the surface 40a at this time.

In addition, the convex portions 15a1 and 15a2 can be measured by observing the side surface 10c or 10d of the capacitor main body at twenty-fold magnification by using the measurement microscope MM-60 manufactured by Nikon Corporation, for example.

Fifth Preferred Embodiment

Figure 24:
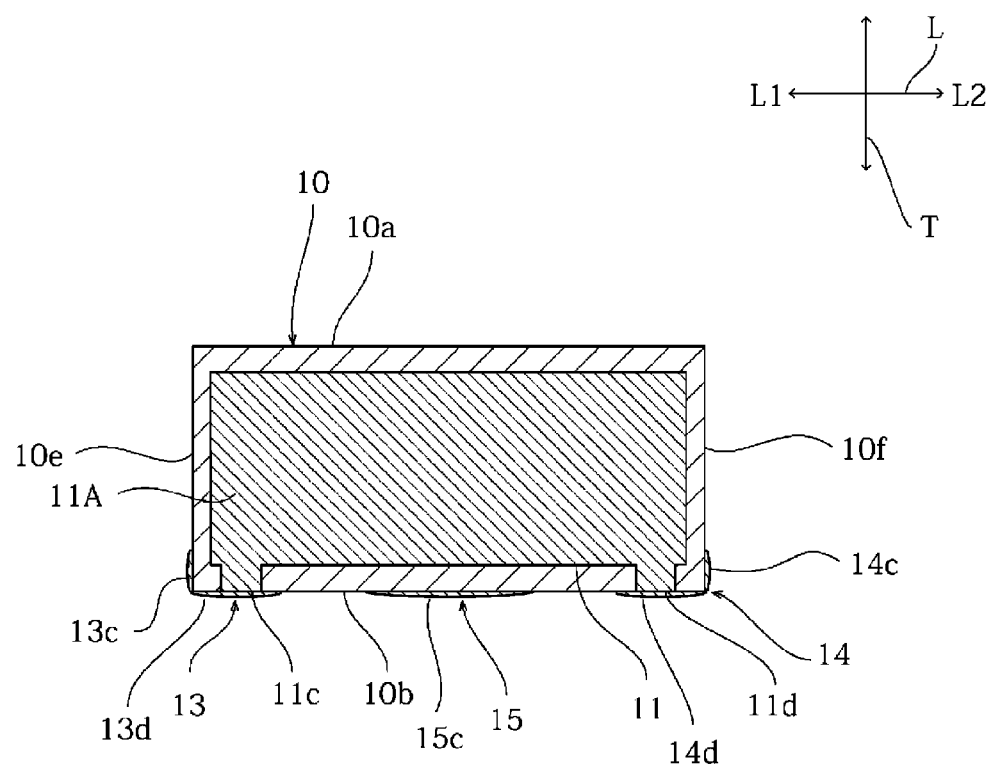
FIG. 24 is a schematic cross-sectional view of a multilayer ceramic capacitor according to a fifth preferred embodiment of the present invention.

FIG. 24 is a schematic cross-sectional view of a multilayer ceramic capacitor according to a fifth preferred embodiment of the present invention.

As shown in FIG. 24, the ground terminal electrode 13 is connected to the first inner electrodes 11. The ground terminal electrode 13 covers the exposed portion of the extending portion 11c of each first inner electrode 11. The portion 13d of the grounding terminal electrode 13, which is positioned on the second main surface 10b and covers the exposed portion of the extending portion 11c, has a thickness which becomes thinner toward the outer side portions (both the L(A) side and the L(B) side) in the length direction L.

The grounding terminal electrode 14 is connected to the first inner electrodes 11. The grounding terminal electrode 14 covers the exposed portion of the extending portion 11d of each first inner electrode 11. The portion 14d of the grounding terminal electrode 14, which is positioned on the second main surface 10b and covers the exposed portion of the extending portion 11d, has a thickness which becomes thinner toward the outer side portions (both the L(A) side and the L(B) side) in the length direction L. In other words, the thickness in the thickness direction T of the portion 14a is the largest in an area of its center along the length direction L.

According to the multilayer capacitor 1, the extending portions 11c and 11d of each inner electrode 11 are overlapped with portions of the terminal electrodes 13 and 14, which are the thickest portions and have an excellent sealing property against moisture, in the length direction L. Therefore, moisture does not easily enter the inner electrodes 11. Accordingly, the multilayer capacitor 1 exhibits excellent moisture resistance.

In order to provide the extending portions 11c and 11d such that the extending portions 11c and 11d of each inner electrode 11 are overlapped with the portions of the terminal electrodes 13 and 14, which are the thickest portions and have the excellent sealing property against moisture, in the length direction L, it is preferable to arrange the extending portions 11c and 11d at inner side portions to some extent in the length direction L. In such a case, if the inner electrodes are provided such that edges of the outer side portions of the extending portions and the edges of the outer side portions of the effective portions are linearly positioned as disclosed in Japanese Unexamined Patent Application Publication No. 2013-46052, an area where the inner electrodes face each other decreases. Therefore, there is a problem in that large capacitance cannot be secured if it is attempted to improve the moisture resistance in the capacitor disclosed in Japanese Unexamined Patent Application Publication No. 2013-46052.

In contrast, according to the multilayer capacitor 1, the effective portion 11A is configured so as to reach the outer side portion (L(A) side) in the length direction L beyond the extending portion 11c and reach the outer side portion (L(B) side) in the length direction L beyond the extending portion 11d. Therefore, the effective portion 11A has a large area. For this reason, the area where the first inner electrodes 11 and the second inner electrodes 12 face each other is large in the multilayer capacitor 1. Accordingly, the capacitance of the multilayer capacitor 1 is large. As described above, the multilayer capacitor 1 has a large capacitance and exhibits excellent moisture resistance.

Specifically, it is possible to obtain electrostatic capacitance from about 47.0 μF to about 48.0 μF, for example, when a length dimension of the capacitor main body 10, in which the grounding terminal electrodes 13 and 14 and the signal terminal electrode 15 are provided, is from about 2.00 mm to about 2.10 mm, a thickness dimension thereof is from about 0.7 mm to about 1.0 mm, and a width dimension thereof is from about 1.20 mm to about 1.40 mm, for example.

In addition, it is preferable that a portion of the effective portion 11A, which corresponds to a portion extending to a left outer edge in the length direction L beyond the extending portion 11c, and at which the length direction L perpendicular or substantially perpendicular intersects the thickness direction T, be chamfered and that the length from the left outer edge of the effective portion 11A on the L(A) side to a left outer edge of the extending portion 11c on the L(A) side range from about 40 μm to about 60 μm, for example. It is preferable that a portion of the effective portion 11A, which corresponds to a portion extending to a right outer edge in the length direction L beyond the extending portion 11d, and at which the length direction L perpendicularly or substantially perpendicular intersects the thickness direction T, be chamfered and that the length from the right outer edge of the effective portion 11A on the L(B) side to the right outer edge of the extending portion 11d on the L(B) side range from about 40 μm to about 60 μm, for example.

The length from the left outer edge of the effective portion 11A on the L(A) side to the left outer edge of the extending portion 11c on the L(A) side and the length from the right outer edge of the effective portion 11A to the right outer edge of the extending portion 11d on the L(B) side can be measured by polishing the multilayer capacitor 1 from the first side surface 10c or the second side surface 10d thereof toward the center portion thereof and observing the thus-appearing inner electrode at twenty-fold magnification by using the measurement microscope MM-60 manufactured by Nikon Corporation, for example.

In addition, the length dimension, the thickness dimension, and the width dimension of the capacitor main body can be measured by using the micrometer MDC-25MX manufactured by Mitutoyo Corporation, for example. In addition, the electrostatic capacitance can be measured by a measurement instrument HP4268A manufactured by Agilent Technologies under conditions of 120 Hz and 0.5 Vrms, for example.

Sixth Preferred Embodiment

Figure 25:
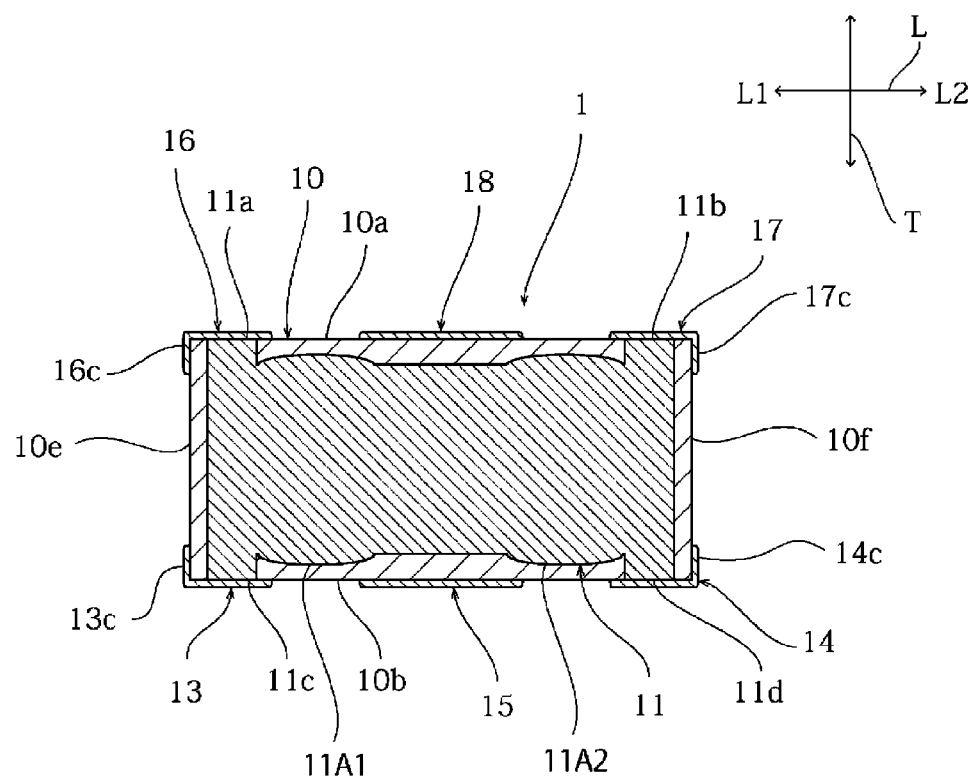
FIG. 25 is a schematic cross-sectional view of a multilayer ceramic capacitor according to a sixth preferred embodiment of the present invention.

FIG. 25 is a schematic cross-sectional view of a multilayer ceramic capacitor according to a sixth preferred embodiment of the present invention.

Incidentally, the moisture resistance of the multilayer capacitor depends on how easily moisture can enter the effective portions of the inner electrodes. If moisture can easily enter the effective portions of the inner electrodes, the moisture resistance of the multilayer capacitor deteriorates. Therefore, it is necessary to make it difficult for moisture to enter the effective portions of the inner electrodes in order to improve the moisture resistance of the multilayer capacitor. As a method of making it difficult for moisture to enter the effective portions, a method of extending the lengths in the thickness direction T of the extending portions can be considered. However, since the areas of the effective portion decrease if the lengths of the extending portions are extended, capacitance tends to decrease.

According to the multilayer capacitor 1, the first and second effective portions 11A and 12A respectively have portions which extend toward the second main surface 10b beyond or below upper edges of the extending portions 11c, 11d, and 12b connected to the main bodies of the respective electrodes 11 and 12, and located between the extending portions 11c and 11d in the length direction. In other words, a minimum distance between the first effective portion 11A and the second main surface 10b is shorter than all of three lengths in the thickness direction T, the length of the portion 11c, the length of the portion 11d, and the length of the portion 12b. And the minimum distance between the second effective portion 12A and the second main surface 10b is shorter than all of three lengths in the thickness direction T, the length of the portion 11c, the length of the portion 11d, and the length of the portion 12b. For this reason, it is possible to increase the area where the first effective portion 11A and the second effective portion 12A face each other while significantly reducing or preventing deterioration in the moisture resistance by securing the lengths of the extending portions 11c, 11d, and 12b and to thus increase the capacitance.

Figure 26:
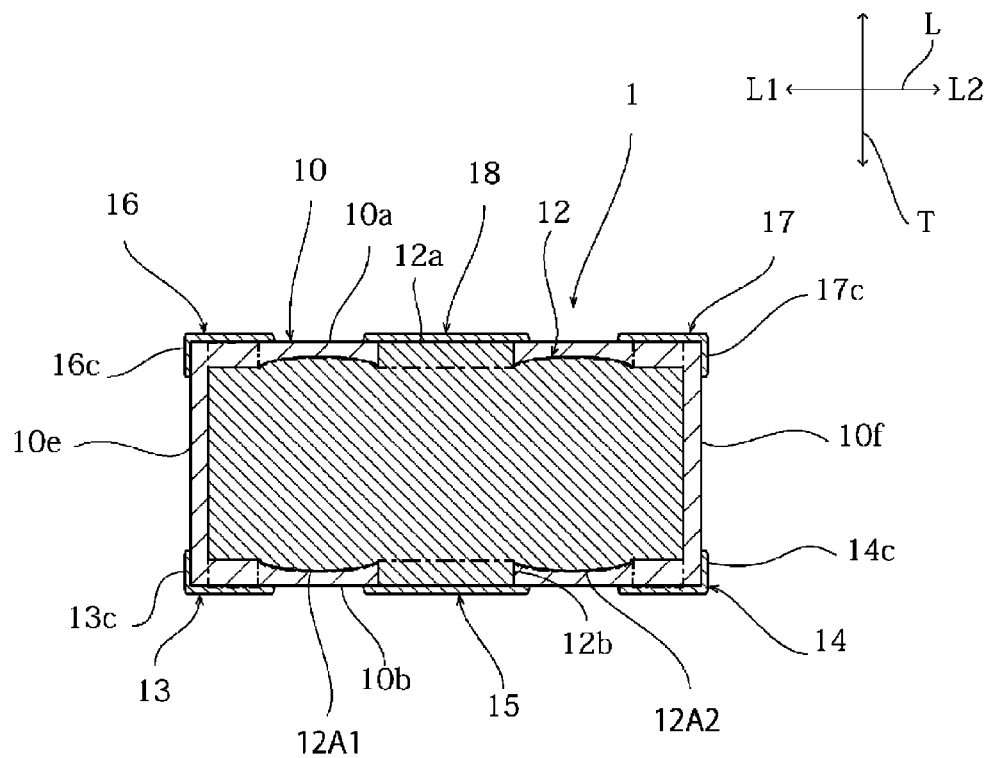
FIG. 26 is a schematic cross-sectional view of the multilayer ceramic capacitor according to the sixth preferred embodiment of the present invention.

Specifically, the first effective portion 11A includes first projecting portions 11A1 and 11A2, which project toward the second main surface 10b, in a region where the extending portions 11c, 11d, and 12b are not provided in the length direction L when viewed from the width direction W as shown in FIGS. 25 and 26 such that a minimum distance in the thickness direction between the first effective portion 11A and the second main surface 10b is shorter than dimensions of the extending portions 11c and 11d. The second effective portion 12A includes second projecting portions 12A1 and 12A2, which project toward the second main surface 10b, in a region where the extending portions 11c, 11d, and 12b are not provided in the length direction L when viewed from the width direction W such that a minimum distance in the thickness direction between the second effective portion 12A and the second main surface 10b is shorter than a dimension in the thickness direction of the extending portion 12b. The first projecting portion 11A1 and the second projecting portion 12A1 face each other in the width direction W. The first projecting portion 11A2 and the second projecting portion 12A2 face each other in the width direction W. Therefore, the capacitance increases by an amount corresponding to the first projecting portions 11A1 and 11A2 and the second projecting portions 12A1 and 12A2. The lengths of the extending portions 11c, 11d, and 12b preferably are the same or substantially the same as those in a case where the first projecting portions 11A1 and 11A2 and the second projecting portions 12A1 and 12A2 are not provided. Therefore, the moisture resistance does not deteriorate.

In addition, the lengths of the first projecting portions 11A1 and 11A2 and the second projecting portions 12A1 and 12A2 in the thickness direction T are preferably equal to or greater than about 0.003 mm and equal to or less than about 0.007 mm, for example.

In addition, shapes of the first and second effective portions 11A and 12A can be checked by observing the first and second effective portions 11A and 12A, which appear by polishing the multilayer ceramic capacitor 1 from the first side surface or the second side surface in the width direction, at twenty-fold magnification by using the measurement microscope MM-60 manufactured by Nikon Corporation, for example.

Seventh Preferred Embodiment

Figure 27:
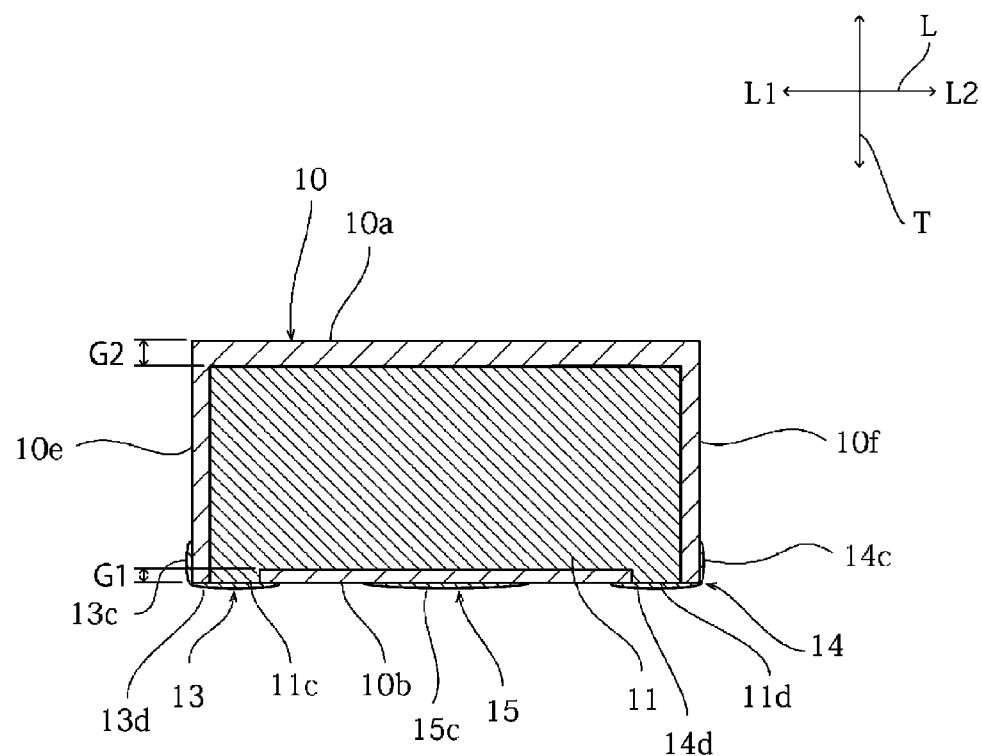
FIG. 27 is a schematic cross-sectional view of a multilayer capacitor according to a seventh preferred embodiment of the present invention.
Figure 28:
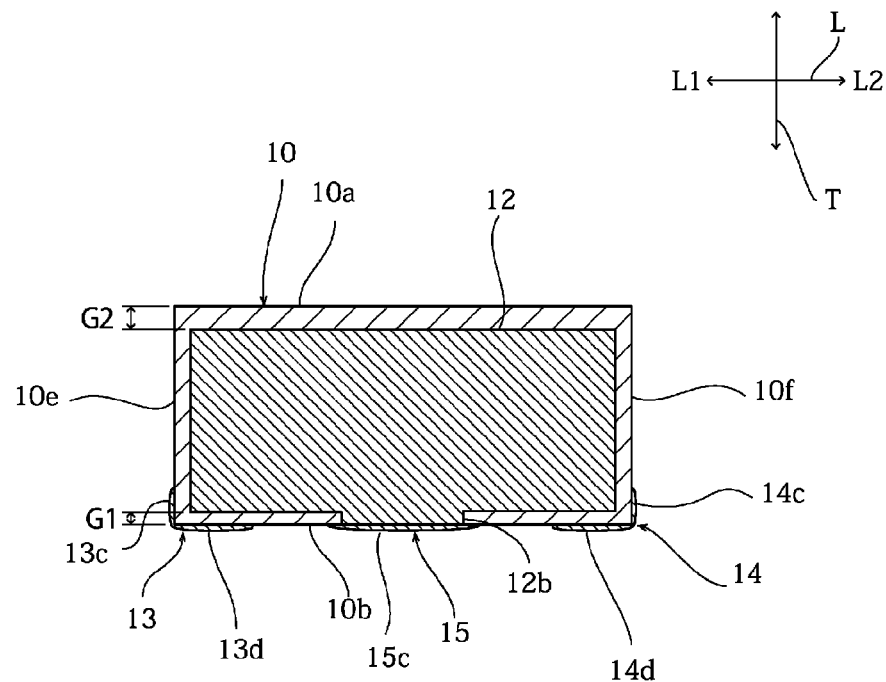
FIG. 28 is a schematic cross-sectional view of the multilayer capacitor according to the seventh preferred embodiment of the present invention.

FIGS. 27 and 28 are schematic cross-sectional views of a multilayer capacitor according to a seventh preferred embodiment of the present invention.

As shown in FIGS. 27 and 28, G1 represents a distance between the effective portions 11A and 12A and the second main surface 10b, and G2 represents a distance between the effective portions 11A and 12A and the first main surface 10a. According to the present preferred embodiment, G1 is shorter than G2. For this reason, chipping-off and breakage do not easily occur even if impact is applied to the first main surface 10a or ridge portions, corner portions, and the like adjacent to the first main surface 10a in the multilayer capacitor main body 10. Accordingly, it is possible to improve reliability of the multilayer ceramic capacitor 1.

In addition, G1 is preferably equal to or greater than about 0.049 mm and equal to or less than about 0.055 mm, and G2 is preferably equal to or greater than about 0.056 mm and equal to or less than about 0.063 mm, for example.

Eighth Preferred Embodiment

Figure 29:
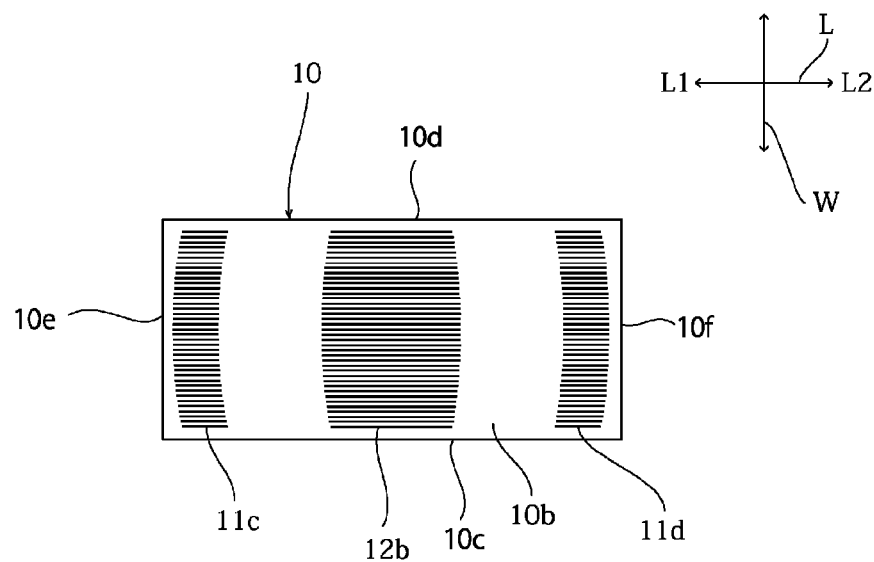
FIG. 29 is a schematic back view of a multilayer ceramic capacitor according to an eighth preferred embodiment of the present invention.

FIG. 29 is a schematic back view of a multilayer ceramic capacitor according to an eighth preferred embodiment of the present invention. As shown in FIG. 29, a dimension of the extending portion 12b in the length direction L is the largest at an area of a center or approximate center of the second main surface 10b in the width direction W and becomes smaller toward the outer side portions in the width direction W. For this reason, the equivalent series inductance (ESL) is made uniform and is significantly reduced. In addition, the dimension of the extending portion 12b in the length direction L may differ at the center of the second main surface 10b in the width direction W and at the ends of the outer side portions by about 40 μm, for example.

A dimension of the extending portion 11c preferably is the smallest at a portion of the extending portion 11c from the center to the first end surface 10e in the width direction W and is the largest at a portion of the extending portion 11c from the outer edge thereof to the first end surface 10e in the width direction W. In addition, a dimension of the extending portion 11d preferably is the smallest at a portion of the extending portion 11d from the center to the second end surface 10f in the width direction W and is the largest at a portion of the extending portion 11d from the outer edge thereof to the second end surface 10f in the width direction W. Also, a distance in the length direction L between the first end surface 10e and the extending portion 11c at a center or approximate center of the second main surface 10b in the width direction W is smaller than each distance in the length direction L between the first end surface 10e and the extending portion 11c nearest to the first and second side surfaces 10c, 10d. Also, a distance in the length direction L between the second end surface 10f and the extending portion 11d at a center or approximate center of the second main surface 10b in the width direction W is smaller than each distance in the length direction L between the second end surface 10f and the extending portion 11d nearest to the first and second side surfaces 10c, 10d. Therefore, cracking does not easily occur in an outer layer portion of the ceramic element assembly 10 in the thickness direction W.

In addition, each of a dimension of the extending portion 11c from the center thereof to the first end surface 10e in the width direction W and a dimension of the extending portion 11d from the center thereof to the second end surface 10f in the width direction W is preferably equal to or greater than about 0.085 mm and equal to or less than 0.097 mm, and each a dimension of the extending portion 11c from the outer edge thereof to the first end surface 10e in the width direction W and a dimension of the extending portion 11d from the outer edge thereof to the second end surface 10f in the width direction W is preferably equal to or greater than about 0.098 mm and equal to or less than about 0.140 mm, for example.

Ninth Preferred Embodiment

Figure 30:
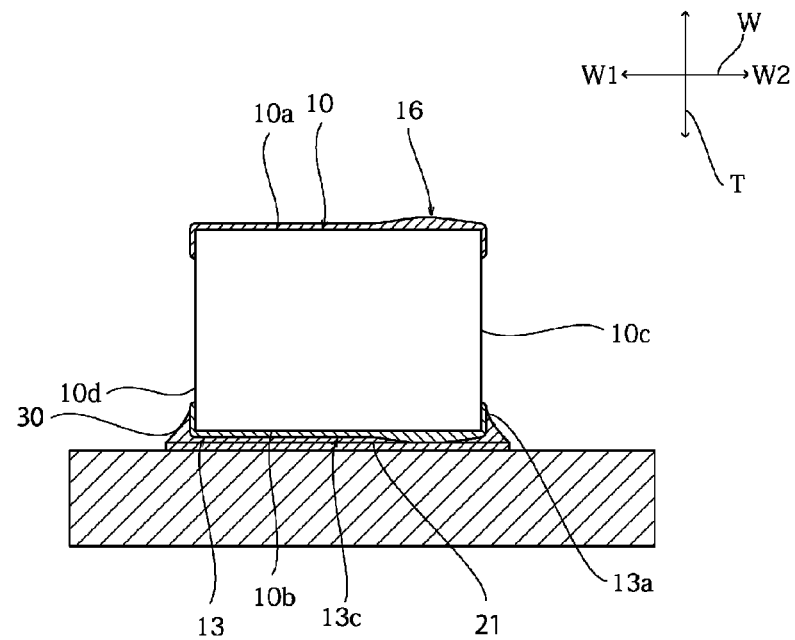
FIG. 30 is a schematic cross-sectional view of an installation structure of a multilayer capacitor according to a ninth preferred embodiment of the present invention.

FIG. 30 is a schematic cross-sectional view of an installation structure of a multilayer capacitor according to a ninth preferred embodiment of the present invention. In the description of the present preferred embodiment, FIGS. 1 to 9 will be referred to in the same manner as in the first preferred embodiment.

Figure 31:
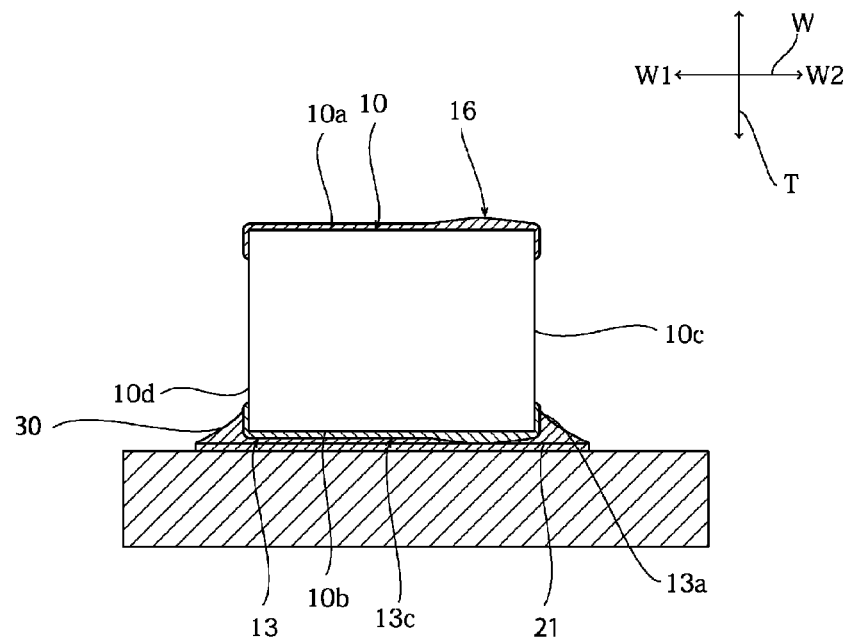
FIG. 31 is a schematic cross-sectional view of an installation structure of a multilayer capacitor according to a reference example.

According to the present preferred embodiment, lengths of the portions 15a and 15b, which are shown in FIGS. 1 and 2, at the ridge portions of the multilayer capacitor main body 10 in the length direction L are longer than a length of the portion 15c, which is shown in FIG. 9, in the length direction L. Similarly, lengths of the portions 13a and 13b, which are shown in FIGS. 1 and 2, at the ridge portions of the multilayer capacitor main body 10 in the length direction L are longer than a length of the portion 13d, which is shown in FIG. 9, in the length direction L. Lengths of portions 14a and 14b, which are shown in FIGS. 1 and 2, at the ridge portions of the multilayer capacitor main body 10 in the length direction L are longer than a length of the portion 14d, which is shown in FIG. 9, in the length direction L. Therefore, it is possible to increase an amount of wetting of solder which configures a joining material 30 as compared with a case shown in FIG. 31, in which dimensions of the portions 15c, 13c, and 14d in the length direction L are short, for example. Accordingly, it is possible to reduce a total area which the multilayer ceramic capacitor and the joining material 30 occupy while securing strong fixing force of the multilayer ceramic capacitor with respect to the installation board 20.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer capacitor comprising:
a multilayer capacitor main body which includes first and second main surfaces, first and second side surfaces, and first and second end surfaces, the first and second main surfaces extending in a length direction and a width direction, the first and second side surfaces extending in the length direction and a thickness direction, and the first and second end surfaces extending in the width direction and the thickness direction;
a first inner electrode extending in the length direction and the thickness direction and including a first effective portion, a first extending portion, and a second extending portion, the first extending portion being connected to the first effective portion and extending to the second main surface, and the second extending portion being connected to the first effective portion and extending to the second main surface;
a second inner electrode extending in the length direction and the thickness direction and including a second effective portion and a third extending portion, the second effective portion facing the first effective portion in the width direction, and the third extending portion being connected to the second effective portion, not facing the first inner electrode, and extending to the second main surface;
a first terminal electrode which is connected to an exposed portion of the first extending portion and extends across a portion of the second main surface on a side of the first end surface in the length direction, the first end surface, and the first and second side surfaces;
a second terminal electrode which is connected to an exposed portion of the second extending portion and extends across a portion of the second main surface on a side of the second end surface in the length direction, the second end surface, and the first and second side surfaces; and
a third terminal electrode which is connected to an exposed portion of the third extending portion and extends across a portion of the second main surface between the first terminal electrode and the second terminal electrode in the length direction and the first and second side surfaces; wherein
the first terminal electrode includes a portion which projects towards a center of the multilayer capacitor main body in the length direction;
the second terminal electrode includes a portion which projects towards the center of the multilayer capacitor main body in the length direction;
a distance in the length direction between the first end surface and the first extending portion at a center or approximate center of the second main surface in the width direction is smaller than each distance in the length direction between the first end surface and the first extending portion nearest to the first and second side surfaces; and
a distance in the length direction between the second end surface and the second extending portion at the center or the approximate center of the second main surface in the width direction is smaller than each distance in the length direction between the second end surface and the second extending portion nearest to the first and second side surfaces.

2. The multilayer capacitor according to claim 1, wherein a dimension of the third terminal electrode on the second main surface in the length direction is greater than a dimension of the first and second terminal electrodes on the second main surface in the length direction.

3. The multilayer capacitor according to claim 1, wherein
L1 represents a dimension of the exposed portion of the first extending portion in the length direction;
L2 represents a dimension of the exposed portion of the second extending portion in the length direction; and
L3 represents a dimension of the exposed portion of the third extending portion in the length direction; wherein $L3 > L1$ and $L3 > L2$ are satisfied.

4. The multilayer capacitor according to claim 1, wherein the first main surface does not contain any terminal electrodes thereon.